(12) United States Patent
Schumacher et al.

(10) Patent No.: US 11,177,655 B2
(45) Date of Patent: Nov. 16, 2021

(54) MULTI-LINE SUPPLY UNIT FOR A VEHICLE CONTROL UNIT

(71) Applicant: Robert Bosch GmbH, Stuttgart (DE)

(72) Inventors: Hartmut Schumacher, Freiberg (DE); David Voigt, Benningen am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/647,190

(22) PCT Filed: Aug. 15, 2018

(86) PCT No.: PCT/EP2018/072116
§ 371 (c)(1),
(2) Date: Mar. 13, 2020

(87) PCT Pub. No.: WO2019/063186
PCT Pub. Date: Apr. 4, 2019

(65) Prior Publication Data
US 2021/0159694 A1 May 27, 2021

(30) Foreign Application Priority Data

Sep. 26, 2017 (DE) .......................... 102017217003.4

(51) Int. Cl.
*H02J 1/10* (2006.01)
*H02H 1/06* (2006.01)
*H02H 11/00* (2006.01)
*H02H 7/26* (2006.01)

(52) U.S. Cl.
CPC .............. *H02J 1/108* (2013.01); *H02H 1/06* (2013.01); *H02H 7/268* (2013.01); *H02H 11/003* (2013.01); *H02J 2310/40* (2020.01)

(58) Field of Classification Search
CPC ...... H02J 1/108; H02J 1/06; H02J 1/04; H02J 2310/40; H02J 3/38; H02J 1/10;
(Continued)

(56) References Cited

U.S. PATENT DOCUMENTS 5,757,099 A * 5/1998 Cheng ....................... H02J 3/01
307/105
7,768,244 B2 8/2010 Perol
(Continued)

FOREIGN PATENT DOCUMENTS

EP 2413450 A2 2/2012
JP H03243119 A 10/1991
(Continued)

OTHER PUBLICATIONS

International Search Report for PCT/EP2018/072116, dated Nov. 29, 2018.

*Primary Examiner* — John W Poos
*Assistant Examiner* — Alex W Lam
(74) *Attorney, Agent, or Firm* — Norton Rose Fulbright US LLP; Gerard Messina

(57) ABSTRACT

A multi-line supply unit for a vehicle control unit, including at least two supply lines each connected to a vehicle voltage source at the input and brought together at a common node at the output; and a protective device, including, in each of the supply lines, at least one first damping diode looped into the supply lines in the forward direction, between the vehicle voltage source and the node; and an operating method for such a multi-line supply unit. At least one switch element is looped into each of the supply lines, respectively, in parallel with the damping diode, respectively; an evaluation and control unit measuring and evaluating a line voltage at the inputs of the supply lines, respectively, and measuring and evaluating a reverse-polarity-protected supply voltage at the common node, and controlling the switch elements in the
(Continued)

supply lines as a function of the evaluation, using corresponding control signals.

25 Claims, 9 Drawing Sheets

(58) Field of Classification Search
 CPC ........ H02H 7/268; H02H 1/06; H02H 11/003;
   H02H 3/20; H02H 7/26; H02H 7/276;
   H02M 3/04; B60L 1/00; B60L 1/04
 See application file for complete search history.

(56) References Cited

U.S. PATENT DOCUMENTS

2006/0002043 A1* 1/2006 DiSalvo ................ H02H 3/105
  361/42

2012/0228943 A1* 9/2012 Nakashima ............. H02J 1/108
  307/66

FOREIGN PATENT DOCUMENTS

| | | |
|---|---|---|
| JP | H05328606 A | 12/1993 |
| JP | H0775348 A | 3/1995 |
| JP | H09140065 A | 5/1997 |
| JP | H09261861 A | 10/1997 |
| JP | 2001053597 A | 2/2001 |
| JP | 2007082306 A | 3/2007 |
| JP | 2009077510 A | 4/2009 |
| JP | 2009159222 A | 7/2009 |
| JP | 2010004617 A | 1/2010 |
| JP | 2013066321 A | 4/2013 |
| JP | 2013517751 A | 5/2013 |
| JP | 2016071427 A | 5/2016 |
| WO | 2013060604 A2 | 5/2013 |

* cited by examiner

MULTI-LINE SUPPLY UNIT FOR A VEHICLE CONTROL UNIT

FIELD

The present invention relates to a multi-line supply unit for a vehicle control unit. The present invention also includes an operating method for such a multi-line supply unit.

BACKGROUND INFORMATION

Electronic control units in a vehicle are normally supplied with power via a first switchable terminal (KL 15R), which is connected to a power source in a first ignition lock position (radio), and/or via a second switchable terminal (KL 15), which is connected to a power source in a second ignition lock position (ignition). If they are control units, which have a "sleep mode" and are also supplied with power when the vehicle is shut off, then they are supplied with power via a continuous positive voltage terminal (KL 30), which is connected to a power source irrespective of the ignition lock position. In the case of a switched-off vehicle in the active "sleep mode," a supply current from the continuous positive voltage terminal is nearly zero. In the non-active "sleep mode," that is, in the normal operating mode of the control unit, the necessary supply current is supplied from the continuous positive voltage terminal. In a further variant, in the normal operating mode of the control unit, the first switchable terminal and/or the second switchable terminal are provided redundantly as further potential supply lines for the control unit. In addition to the redundancy in supply, this has the advantage that the switched supply lines may also be used for the redundant, wake-up signaling of the corresponding control unit. The primary wake-up function and/or the sleep mode may be controlled via suitable bus activities and/or bus commands. The provided supply lines are connected in the control unit in a "wired-or" configuration so as to be protected against polarity reversal. In this manner, it may be ensured that in the case of a polarity reversal of a supply line or a plurality of supply lines, no damage may occur in the control unit. In addition, the "wired-or interconnection" of the supply lines in the control unit is used for redundantly powering the control unit during the normal operating mode. To date, silicon diodes have been used as reverse-polarity protection devices in the continuous current range of up to 2 A. This results in voltage drops of up to 1 V and a power loss of up to 2 W. Schottky diodes, through which a continuous current of up to 4 A may effectively manifest itself, are used in improved systems having lower voltage drops. In this case, the voltage drops are below 0.6 V, which may produce a power loss of up to 2.4 W.

SUMMARY

An example multi-line supply unit for a vehicle control unit, in accordance with the present invention, and the operating method for a multi-line supply unit in accordance with the present invention, may have the advantage that the voltage drops for the reverse-polarity protection, and consequently, the power losses of the individual supply lines during continuous current operation, as well, may be reduced markedly by the switch elements looped in in parallel with the damping diodes. In this connection, in each supply line, the damping diodes advantageously provide static and/or dynamic, reverse-polarity protection and feedback protection. In this manner, increasing demands for current from future, larger control units for safety systems, assistance systems, etc., which are used, in particular, in vehicles having at least semiautonomous driving functions, may be attended to in an advantageous manner. In addition, apart from reverse-polarity protection, specific embodiments of the multi-line supply unit for a vehicle control unit also take into account further filtering circuits for subsequent switching controllers.

Specific example embodiments of the multi-line supply unit for a vehicle control unit are preferably implemented as two-line supply units; as a rule, a first supply line being supplied permanently with power via a continuous positive voltage terminal of an ignition lock, and a second supply line being supplied with power via a switchable terminal of the ignition lock. In addition, in specific embodiments of the multi-line supply unit for a vehicle control unit, only currents below 100 μA flow through the supply lines in the sleep mode of the corresponding control unit.

Furthermore, specific embodiments of the multi-line supply unit for a vehicle control unit monitor the individual supply lines, in order to detect, in particular, an absence of a supply line or a short circuit of a supply line. Specific embodiments of the multi-line supply unit for a vehicle control unit are advantageously implemented in such a manner, that an energy store may be used as an output load. This energy store preferably takes the form of a capacitor and, in response to a sudden drop, short circuit and/or interruption of the multi-line supply unit, may supply power for a defined time span of usually a few 100 μs up to 10 ms, in order to maintain the supply of power to the control unit, without large portions of this power being fed back into the multi-line supply unit.

Specific example embodiments of the multi-line supply unit for a vehicle control unit advantageously prevent permanent feedback from one supply line into another supply line, when the supply lines have different voltage levels. Even in the case of dynamic events, in particular, in the case of a.c. voltage components on the d.c. voltages of the supply lines, a dynamic feedback power is advantageously limited. In addition, specific embodiments of the multi-line supply unit for a vehicle control unit include protective measures against positive and/or negative pulses on the supply lines and allow, in particular, asymmetric clamping or limiting of the positive and negative pulses.

Specific example embodiments of the present invention provide a multi-line supply unit for a vehicle control unit, having at least two supply lines, which are each connected to at least one vehicle voltage source at the input and are joined at a common node at the output; and having a protective device, which, in the at least two supply lines, includes, in each instance, at least a first damping diode that is looped into the at least two supply lines in the forward direction, between the at least one vehicle voltage source and the node. In this connection, at least one switch element is looped into each of the at least two supply lines, in parallel with the at least one damping diode. In addition, in each instance, an evaluation and control unit measures a line voltage at the inputs of the at least two supply lines, as well as a reverse-polarity-protected supply voltage at the common node, and evaluates them. The evaluation and control unit controls the switch elements in the at least two supply lines as a function of the evaluation, using corresponding control signals.

In addition, an operating method for such a multi-line supply unit is provided, which measures and evaluates, in each instance, a line voltage at the inputs of the at least two supply lines and a reverse-polarity-protected voltage at the common node. In this connection, the switch elements in the at least two supply lines are controlled as a function of the evaluation, using corresponding control signals.

Presently, the evaluation and control unit may be understood to be an electrical device, such as a control unit, in particular, a driver assistance control unit, an integrated safety system, or an airbag control unit, which processes and/or evaluates acquired sensor signals, such as video signals, radar signals, lidar signals, temperature signals, infrared signals, positional signals, acceleration signals, pressure signals, rate-of-rotation signals, etc., and/or voltages and/or currents. The evaluation and control unit may include at least one interface, which may take the form of hardware and/or software. In a hardware design, the interfaces may be, for example, part of a so-called system ASIC that includes many different functions of the evaluation and control unit. However, it is also possible for the interfaces to be separate, integrated circuits or to be at least partially made up of discrete components. In a software design, the interfaces may be software modules that are present, for example, in a microcontroller, next to other software modules. Additionally advantageous is a computer program product having program code, which is stored on a machine-readable carrier, such as a solid-state memory, a hard-disk memory or an optical memory, and is used to perform the evaluation when the program is executed by the evaluation and control unit.

The measures and further refinements of the present invention described herein render possible advantageous improvements to the example multi-line supply unit for a vehicle control unit in accordance with the present invention, as well as to the example operating method for such a multi-line supply unit in accordance with the present invention.

It is particularly advantageous that the evaluation and control unit may compare the individual line voltages to each other and/or to the reverse-polarity-protected supply voltage and generate the control signals for the at least one switch element as a function of the comparisons, using a hardware control unit. In the following, a hardware control unit is understood to be an electrical circuit, which is made up of discrete electronic or electrical parts or components, so that highly rapid evaluation operations for identifying internal conditions, as well as short switching times, may be implemented. This means that the hardware control unit may be connected directly to the inputs of the supply lines and to the common node via corresponding contacts and connections, and powered via the common node. The hardware control unit or parts of the hardware control unit may be switched on or off via a sleep input. The evaluation and control unit may close the at least one switch element, using the control signals generated by the hardware control unit, if a difference between the corresponding line voltage and the reverse-polarity-protected supply voltage at the common node exceeds a predefined, first threshold value. In this manner, a voltage drop across the corresponding supply line and, therefore, the power loss, may be reduced in an advantageous manner. In addition, the evaluation and control unit may open the at least one switch element, using the control signals generated by the hardware control unit, if the difference between the corresponding line voltage and the reverse-polarity-protected supply voltage at the common node falls below a predefined, second threshold value or becomes negative. In this manner, feedback from the common node into the affected supply line via the closed switch element may be prevented in an advantageous manner. In addition, a difference between the first threshold value and the second threshold value may be set, using a variable resistor in the hardware control unit. In this manner, a hysteresis for the switch elements in the individual supply lines may be specified in an advantageous manner, in order to improve the stability of the switching decision. In the normal case, all of the switch elements are constructed in the same manner and are operated, using identical hystereses. In this case, a common setting of the hysteresis for all of the switch elements is sufficient. Alternatively, a separate hysteresis may be specified for each switch element. The internal resistance of the switch element, the stability of the switching decision, and the reverse-current detection level in the corresponding supply line may be taken into account for setting the hysteresis. Consequently, the stability of the switching decision may be made a function of the level of feedback current to be detected individually, and adapted to the internal resistance of the switch elements used.

In one advantageous refinement of the example multi-line supply unit, the evaluation and control unit may include a processing unit, which checks the at least two supply lines individually as a function of predefined conditions. In this connection, in order to check the at least two supply lines, the processing unit may generate at least one control signal and output it to the hardware control unit, which may generate and output the corresponding control signals for the at least one switch element in response to the at least one control signal. In order to detect line interruptions or short circuits or other problems, or in order to check the quality of a supply line, the switch elements in the individual supply lines may be opened briefly, and the responses of the individual line voltages and the reverse-polarity-protected supply voltage at the common node may be measured and evaluated. For example, an internal resistance of the corresponding supply line may be ascertained and evaluated as a measure of the quality. In this case, the quality of the supply line is inversely proportional to the internal resistance, that is, the quality of the supply line decreases with increases internal resistance.

In a further advantageous refinement of the example multi-line supply unit, the processing unit may generate a warning signal and/or store a fault and output it via an acoustic and/or optical output unit, and/or via a diagnostic interface, if the processing unit detects a line interruption and/or a problem and/or poor quality in the at least two supply lines. In this manner, the driver may be warned in a timely manner and reassume control over at least semiautomatic functions, or the problem may be rectified during the next service. Thus, for example, the type of fault, location of fault and time of fault may be stored until the next service.

In a further advantageous refinement of the multi-line supply unit, a field effect transistor may form the at least one first damping diode and the at least one switch element in each of the two supply lines. The field-effect transistors are preferably manufactured as these p-channel MOS field-effect transistors (PMOSFET), which are conductive in the forward direction via a bulk diode between the drain and the source. This allows simple triggering via a positive source-gate voltage. In order to reduce a pulse loading of the at least one switch element, at least a second damping diode may be positioned in the at least two supply lines, in each instance, parallelly to the at least one first damping diode and to the at least one switch element. The at least one second damping diode protects the corresponding switch element, in particular, in the case of a variant as a PMOSFET, from high, negative voltage pulses, which may be generated on the supply line, for example, in switching operations, such as the switching-off of an inductor, such as a seat heater, window heater, etc., positioned in parallel with the control unit. The at least one second damping diode may be constructed, preferably, as a high-output suppressor diode (TSV) having an avalanche voltage in the range of 24 V to 40 V. In addition, the outputs of the at least two supply lines may each be connected to ground individually in front of the common node, or jointly at the common node, across at least one third damping diode, which is suitable for reducing a positive pulse loading of the at least two supply lines. In this connection, the at least one third damping diode may limit a negative voltage occurring at the common node to a specifiable value and trip an electrical vehicle circuit breaker in response to a defective line switch in the case of polarity reversal. For example, the negative voltage may be limited to a value in the range of −0.3 V to −1.2 V. The addition of the circuit including the at least one third, central damping diode is used for protecting the multi-line supply device from positive pulses, including a sudden loss of load (load dump). If a positive pulse loading occurs in one of the supply lines, then the pulses are clamped or limited by the at least one third damping diode. The at least one third damping diode may be constructed, preferably, as a high-output suppressor diode (TSV) having an avalanche voltage in the range of 30V to 42 V. The pulse loadings of the switch elements may be reduced by the at least one second damping diode and the at least one third damping diode, so that more cost-effective transistor types having a lower source-drain strength and low volume resistance and a lower space requirement may be used in an advantageous manner. The static reverse-polarity protection of the supply line is not negatively influenced by the at least one additional, second damping diode and the at least one third damping diode. In addition, the use of the at least one second damping diode and the at least one third damping diode allows the option of asymmetrically clamping or limiting negative or positive supply pulses, which means that the magnitude or absorption power of the negative clamping element may be decoupled from that of the positive clamping element. Furthermore, the unidirectional clamping at the common node advantageously unites increased protection from polarity reversal in the case of a defect of a switch element in the supply line, with the objective of tripping the line circuit breaker before damage occurs in the control unit.

In a further advantageous refinement of the example multi-line supply unit in accordance with the present invention, the inputs of the at least two supply lines may each be connected to ground and damped by at least one RC element, which includes an ohmic resistor and a capacitor. In addition, the outputs of the at least two supply lines may each be connected to ground and damped individually in front of the common node, or jointly at the common node, by at least one RC element, which includes an ohmic resistor and a capacitor. In this manner, inductive interference voltages, which are produced by a connection to the vehicle battery next to an ohmic resistor, may be damped, for example, by the supply line. This may advantageously prevent switching operations from producing, in the individual supply lines and at the common node, interference voltages, which exceed limiting interference values and may endanger optimum control of the switch elements. The sizing of the RC elements is a function of the equivalent inductances and currents of the individual supply lines.

In one further advantageous refinement of the example multi-line supply unit in accordance with the present invention, the common node may be connected to the control unit via a passive filter. Preferably, the passive filter may have an energy reserve, which may compensate for a short-term, sudden voltage drop. The energy reserve may preferably include a capacitor. In one particularly advantageous refinement, the passive filter may be constructed as a multi-line T filter. In this connection, a first filter inductor may be looped into each of the at least two supply lines, between the switch element and the common node, and a common, second filter inductor may be looped in between the common node and a filter output. This specific embodiment allows the supply lines to be connected symmetrically to the following control unit and permits limiting frequencies of less than 20 kHz, in order to assist subsequent switching controllers of the control unit with regard to a PSSR (power supply rejection ratio) for interference frequencies above the control frequency.

In one advantageous refinement of the example operating method in accordance with the present invention, the individual line voltages may be compared to each other and/or to the reverse-polarity-protected supply voltage, and the control signals for the at least one switch element may be generated by the hardware control unit as a function of the comparisons.

In a further advantageous refinement of the example operating method in accordance with the present invention, the at least two supply lines may be checked individually during operation as a function of predefined conditions. For example, the at least two supply lines may be checked at predefined intervals. Additionally, or as an alternative, the at least two supply lines may be checked individually, if a voltage difference between the line voltages exceeds a predefined magnitude.

In a further advantageous refinement of the example operating method, in a first check of the individual supply lines, the at least one switch element of the supply line to be checked may be opened, and the responses of the corresponding line voltage and the reverse-polarity-protected supply voltage at the common node may be measured and evaluated. In this connection, a line interruption in the supply line to be checked may be detected, if, in response to an opened switch element, the corresponding line voltage is below a predefined, minimum limiting value, for example, in a voltage range of 0 V to 6 V. After the check, the opened switch element is closed again, and the next supply line may be checked by opening the corresponding switching element. The short-term checking of a supply line, by opening the associated switch element, does not endanger the supply of power to the control units in any way, since the affected supply line may still ensure the supply of power to the control units via the first damping diode and, in addition, via the parallel, second damping diode.

In a further advantageous refinement of the example operating method, in the case of a second check of the at least two supply lines, only the corresponding switch element of the supply line to be checked may be closed, and the switch elements of the other supply lines may be opened, and the response of the corresponding line voltage in the electrically loaded supply line to be checked may be measured and evaluated. In this connection, a problem, which is caused, for example, by poor contacts or an equivalent resistance of the supply line to be checked that is overly high, may be detected in the electrically loaded supply line to be checked, if the corresponding line voltage in response to a closed switch element is below a predefined limiting load value.

In a further advantageous refinement of the example operating method, the individual line voltages may be compared to each other and, in each instance, to a vehicle voltage of the connected vehicle voltage source. An internal resistance of the corresponding supply line may be deduced on the basis of the comparison. In the same manner, if a known change in current occurs, the internal resistance of the supply line may be deduced by evaluating all of the line voltage differences prior to and subsequent to the switching-off of the corresponding switch element.

In a further advantageous refinement of the example operating method, a warning signal may be generated, and/or a fault may be stored and outputted by an acoustic and/or optical output unit and/or via a diagnostic interface, if a line interruption and/or a problem and/or poor quality in the at least two supply lines is detected. In this connection, poor quality may be detected, for example, due to the internal resistance's exceeding a predefined limiting value. In this manner, the driver may be warned in a timely manner and reassume control over at least semiautomatic functions, or the problem may be rectified during the next service. Thus, for example, the type of fault, location of fault and time of fault may be stored until the next service.

Exemplary embodiments of the present invention are shown in the figures and are explained in greater detail below. In the figures, identical reference characters denote components or elements, which perform the same or analogous functions.

DETAILED DESCRIPTION OF EXAMPLE EMBODIMENTS

Figure 1:
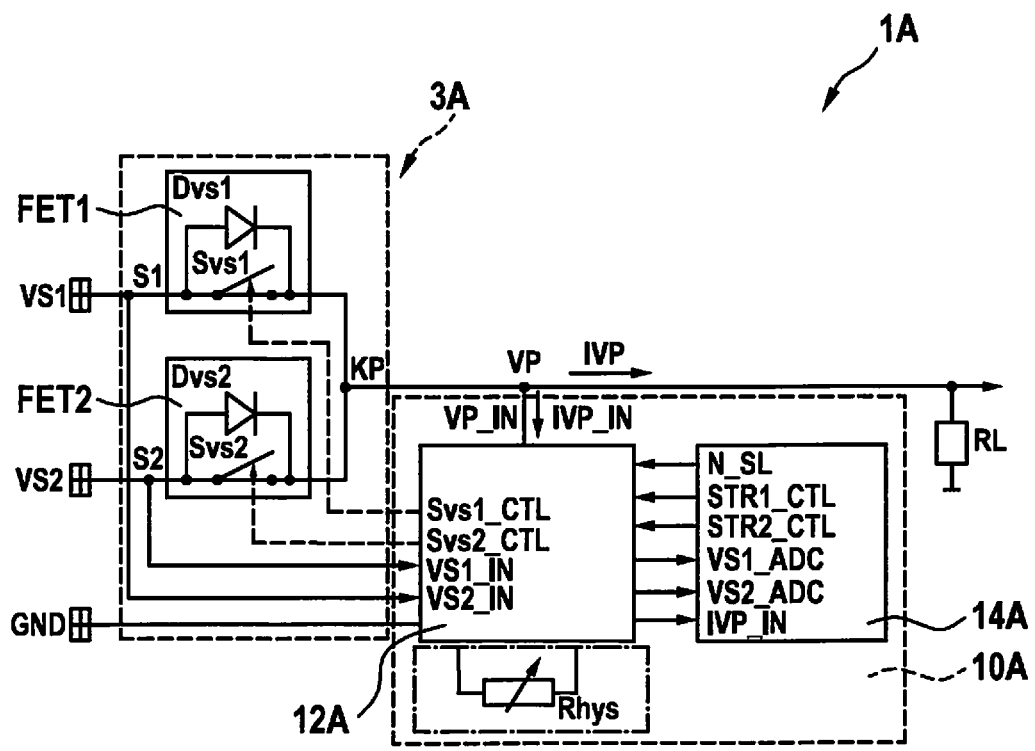
FIG. 1 shows a schematic circuit diagram of an exemplary embodiment of a multi-line supply unit of the present invention for a vehicle control unit, including a first exemplary embodiment of a protective device.

As is shown in FIGS. 1 to 7, the depicted exemplary embodiments of a multi-line supply unit 1A, 1B, 1C of the present invention for a vehicle control unit 2 each include at least two supply lines S1, S2, which are each connected to at least one vehicle voltage source B, B1, B2 at the input and are joined at a common node KP at the output; and include a protective device 3A, 3B, 3C, 3D, which, in the at least two supply lines S1, S2, has at least one first damping diode Dvs1, Dvs2, respectively, that is looped into the at least two supply lines S1, S2, in the forward direction, between the at least one vehicle voltage source B, B1, B2 and node KP. In this connection, at least one switch element Svs1, Svs2 is looped into each of the at least two supply lines S1, S2, respectively, in parallel with the at least one damping diode Dvs1, Dvs2, respectively; an evaluation and control unit 10A, 10B, 10C measuring a line voltage VS1, VS2 at the inputs of the at least two supply lines S1, S2, respectively, as well as a reverse-polarity-protected supply voltage VP at common node KP, and evaluating them. Evaluation and control unit 10A, 10B, 10C controls switch elements Svs1, Svs2 in the at least two supply lines S1, S2 as a function of the evaluation, using corresponding control signals Svs1_CTL, Svs2_CTL.

In the exemplary embodiments shown, multi-line supply unit 1A, 1B, 1C is implemented, in each instance, as a two-line supply unit having two supply lines S1, S2. In alternative exemplary embodiments not shown, multi-line supply unit 1A, 1B, 1C may also include more than two supply lines S1, S2.

As is further shown FIGS. 1 through 7, in depicted supply lines S1, S2, first damping diodes Dvs1, Dvs2 are used for static and/or dynamic reverse-polarity protection, power-supply security in the case of an open switch element Svs1, Svs2, and for feedback protection. In order to reduce a voltage drop in the supply direction, switch elements Svs1, Svs2, which are positioned in parallel with first damping diodes Dvs1, Dvs2, are used in supply lines S1, S2. Evaluation and control unit 10A, 10B, 10C compares individual line voltages VS1, VS2 to each other and/or to reverse-polarity-protected supply voltage VP and generates control signals Svs1_CTL, Svs2_CTL for switch elements Svs1, Svs2 as a function of the comparisons, using a hardware control unit 12A, 12B, 12C. To this end, hardware control unit 12A, 12B, 12C uses connections to the two supply lines S1, S2 via terminals VS1_IN, VS2_IN, as well as to common node KP via terminal VP_IN. Hardware control unit 12A, 12B, 12C is powered by reverse-polarity-protected supply voltage VP and ground GND via terminals VP_IN and GND.

In normal operation, evaluation and control unit 10A, 10B, 10C closes switch elements Svs1, Svs2, using hardware control unit 12A, 12B, 12C, if a difference between corresponding line voltage VS1, VS2 and reverse-polarity-protected supply voltage VP at common node KP exceeds a predefined, first threshold value. Evaluation and control unit 10A, 10B, 10C opens switch elements Svs1, Svs2, using hardware control unit 12A, 12B, 12C, if the difference between corresponding line voltage VS1, VS2 and reverse-polarity-protected supply voltage VP at common node KP falls below a predefined, second threshold value and/or becomes negative. As is further shown in FIGS. 1, 2 and 6, a difference between the first threshold value and the second threshold value may be set, using a variable resistor Rhys in hardware control unit 12A, 12B, 12C. In this context, in the normal case for actual vehicle power supplies, a first switch element Svs1 is closed, if a first control signal Svs1_CTL has a low value. If first control signal Svs1_CTL is processed in a special driver for first switch element Svs1, then, depending on the setting, either logical "high" or logical "low" voltage signals may close first switch element Svs1. This is the case, if a first line voltage VS1 is greater than a difference of reverse-polarity-protected supply voltage VP and a predefined hysteresis value. Otherwise, first switch element Svs1 remains open. In the normal case for actual vehicle power supplies, a second switch element Svs2 is closed, if a second control signal Svs2_CTL has a low value. If second control signal Svs2_CTL is processed in a special driver for second switch element Svs2, then, depending on the setting, either logical "high" or logical "low" voltage signals may close second switch element Svs1. This is the case, when a second line voltage VS2 is greater than a difference of reverse-polarity-protected supply voltage VP and a predefined hysteresis value. Otherwise, second switch element Svs2 remains open. The switch hysteresis advantageously prevents oscillation of switch elements Svs1, Svs2, since after the closing of corresponding switch element Svs1, Svs2, reverse-polarity-protected supply voltage VP increases to only slightly below line supply voltage VS1, VS2 due to the low switch resistance. The switch hysteresis may either be fixedly selected for identical switch elements Svs1, Svs2. In the exemplary embodiments shown, the hysteresis may be adjusted, using optional resistor Rhys. The internal resistances of switch elements Svs1, Svs2, the level of the line current in the supply direction, a desired stability of the switching decision, and a reverse-current detection level in corresponding supply line S1, S2 are decisive for the adjustment.

Figure 2:
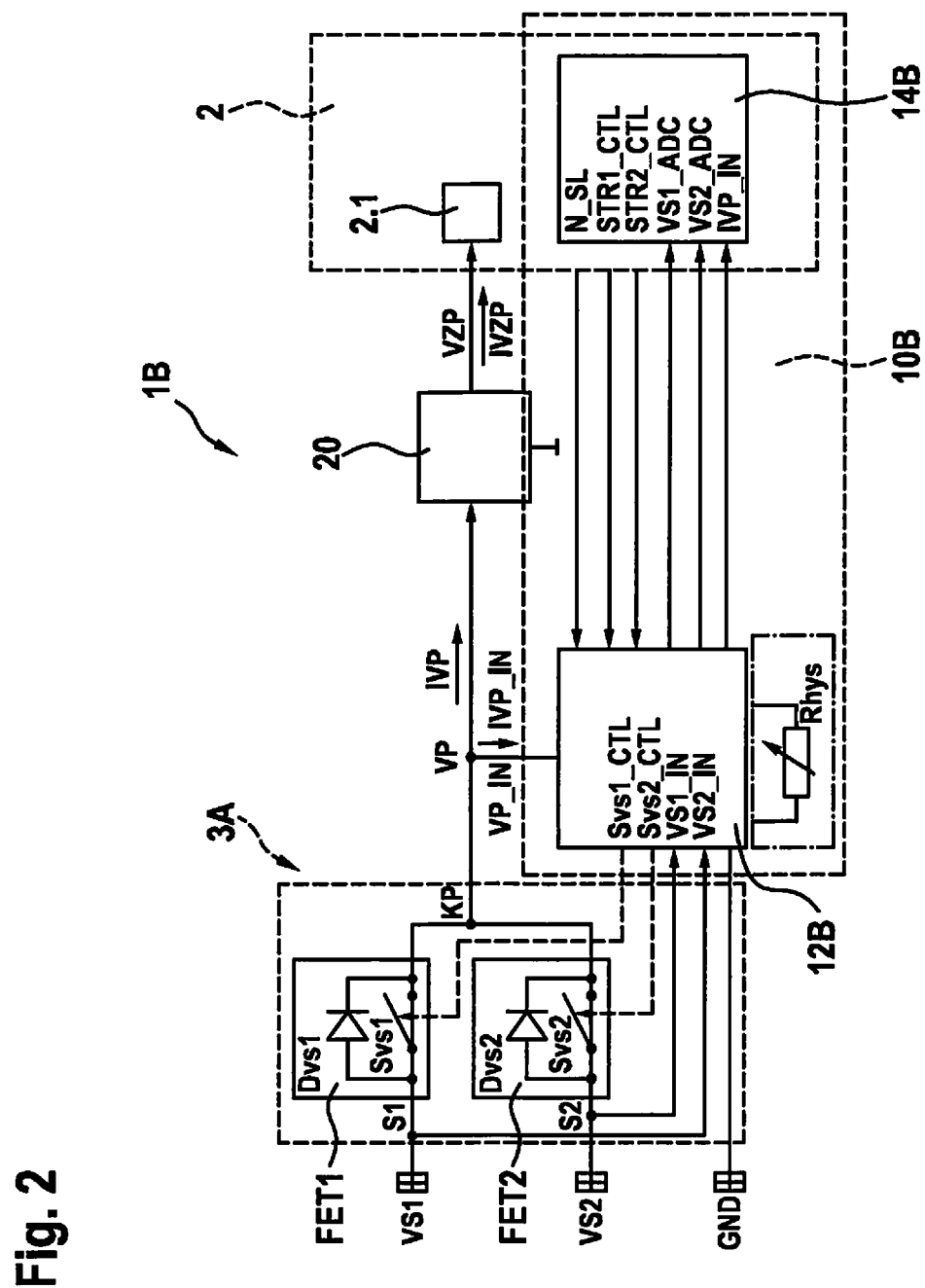
FIG. 2 shows a schematic circuit diagram of a second exemplary embodiment of a multi-line supply unit of the present invention for a vehicle control unit, including a first exemplary embodiment of a protective device.
Figure 6:
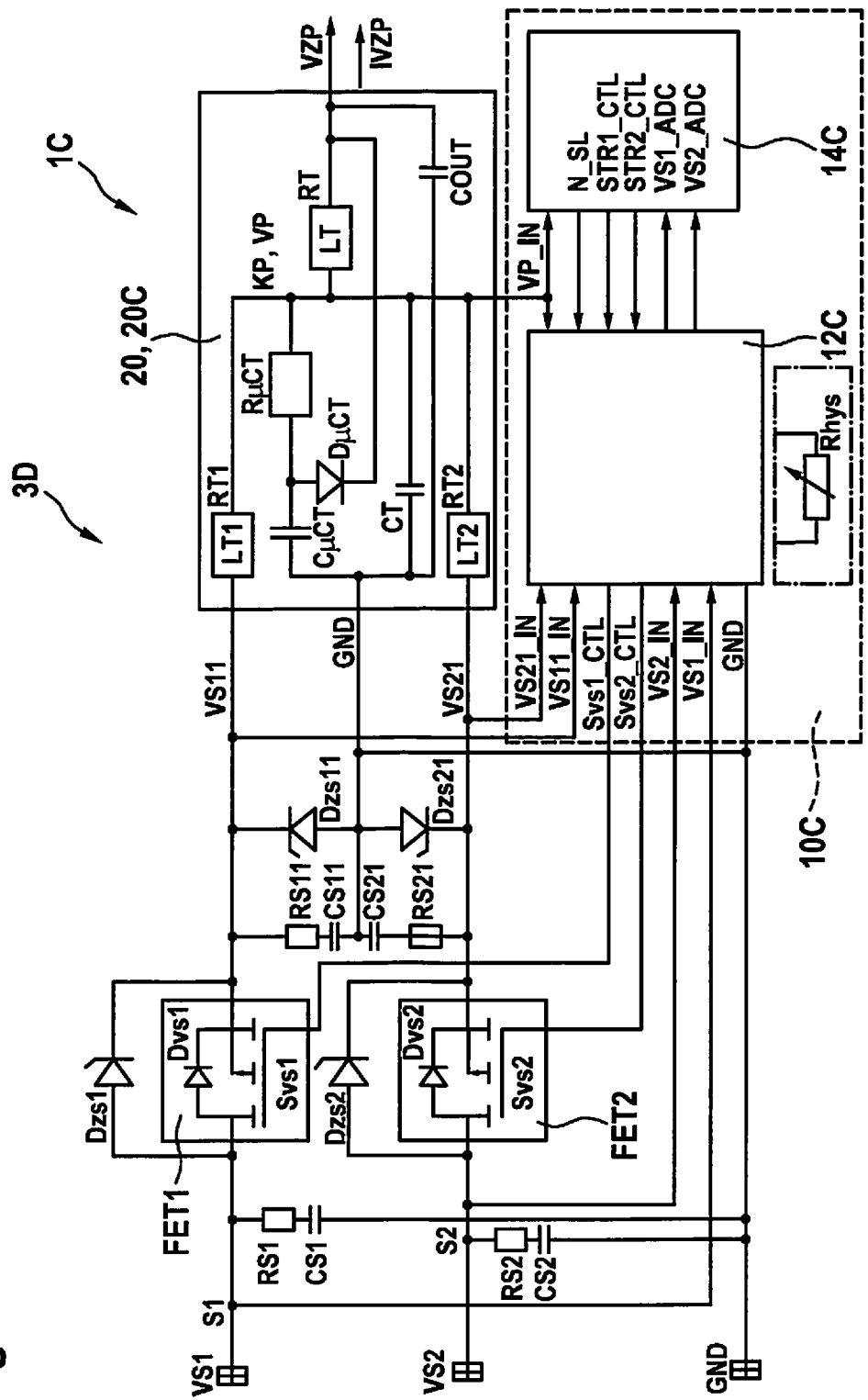
FIG. 6 shows a schematic circuit diagram of a third exemplary embodiment of a multi-line supply unit of the present invention for a vehicle control unit, including a fourth exemplary embodiment of a protective device.

As is further shown in FIGS. 1, 2 and 6, evaluation and control unit 10A, 10B, 10C includes a processing unit 14A, 14B, 14C, which checks the two supply lines S1, S2 individually as a function of predefined conditions. In order to check the two supply lines S1, S2, processing unit 14A, 14B, 14C generates corresponding control signals STR1_CTL, STR2_CTL and outputs them to hardware control unit 12A, 12B, 12C. In response to control signals STR1_CTL, STR2_CTL, hardware control unit 12A, 12B, 12C generates corresponding control signals Svs1_CTL, Svs2_CTL and outputs them to the two switch elements Svs1, Svs2 or to their drivers.

In the exemplary embodiments shown in FIGS. 1 and 6, hardware control unit 12A, 12C and processing unit 14A, 14C of evaluation and control unit 10A, 10C are constructed as a unit and may be situated in the region of switch elements Svs1, Svs2 or constructed as part of the control unit.

In the exemplary embodiment shown in FIG. 2, hardware control unit 12B and processing unit 14B of evaluation and control unit 10B are positioned separately from each other. As is further shown in FIG. 2, hardware control unit 12B is situated in the region of switch elements Svs1, Svs2, and processing unit 14B is integrated in control unit 2. In addition, in the exemplary embodiment of multi-line supply unit 1B for a vehicle control unit 2 shown in FIG. 2, a switching controller 2.1 of control unit 2 is coupled to common node KP of multi-line supply unit 1B via a passive filter 20. Passive filter 20 damps disturbances to the vehicle electrical system, in particular, sinusoidal interference over 5 kHz to 20 kHz, suppresses the conducted interference of switching controller 2.1 on the vehicle electrical system and ensures the supply of power to control unit 2 in the case of short-term, sudden drops in reverse-polarity-protected supply voltage VP. In the following, an advantageous exemplary embodiment 20C of passive filter 20 is described with reference to FIG. 6.

As is further shown in FIGS. 3 through 6, in the depicted exemplary embodiments of protective device 3B, 3C, 3D, the inputs of the two supply lines S1, S2 are both connected to ground GND and damped via an RC element, which includes an ohmic resistor Rs1, Rs2 and a capacitor Cs1, Cs2. As is further shown in FIGS. 3 and 4, in the exemplary embodiment shown, the outputs of the two supply lines S1, S2 are connected jointly to ground and damped at common node KP by an RC element, which includes an ohmic resistor RP and a capacitor CP. The exemplary embodiment represented in FIG. 4 only differs from the exemplary embodiment shown in FIG. 3 by the number of vehicle energy sources B, B1, B2. As is further shown in FIG. 3, protective device 3B of multi-line supply unit 1A is connected to only one vehicle power source B, which powers first supply line S1 as a permanent vehicle voltage VB via a first line that is represented by a first ohmic line resistor Ri1 and a first line inductor Li1, and which powers second supply line S2 as a vehicle voltage VB, which is conducted by a second line that is represented by a second ohmic line resistor Ri2 and a second line inductor Li2 and is switched across an ignition lock ZS. As is further shown from FIG. 4, protective device 3B of multi-line supply unit 1A is connected to two vehicle power sources B1, B2. In this connection, a first vehicle power source B1 powers first supply line S1 as a permanent, first vehicle voltage VB1 via a first line, which is represented by a first ohmic resistor Ri1 and a first line inductor Li1, and a second vehicle power source B2 powers second supply line S2 as a second vehicle voltage VB2, which is conducted via a second line that is represented by a second ohmic line resistor Ri2 and a second line inductor Li2, and which is connected across ignition lock ZS. As is further shown in FIGS. 5 and 6, the outputs of the depicted exemplary embodiments are each connected to ground GND and damped individually in front of common node KP, via an RC element, which includes, in each instance, an ohmic resistor Rs11, Rs21 and a capacitor Cs11, Cs21. Since a connection to a vehicle power source B1, B2 includes, in addition to ohmic resistor Ri1, Ri2, the line inductor Li1, Li2, as well, interference voltages on line voltages VS1, VS2 and on reverse-polarity-protected supply voltage VP, due to the switching operations of switch elements Svs1, Svs2, may be compensated for by the RC elements; the interference voltages otherwise possibly being able to endanger the optimum control of switch elements Svs1, Svs2. The sizing of the RC elements is a function of line inductors Li1, Li2, as well as of the line currents of supply lines S1, S2.

Figure 3:
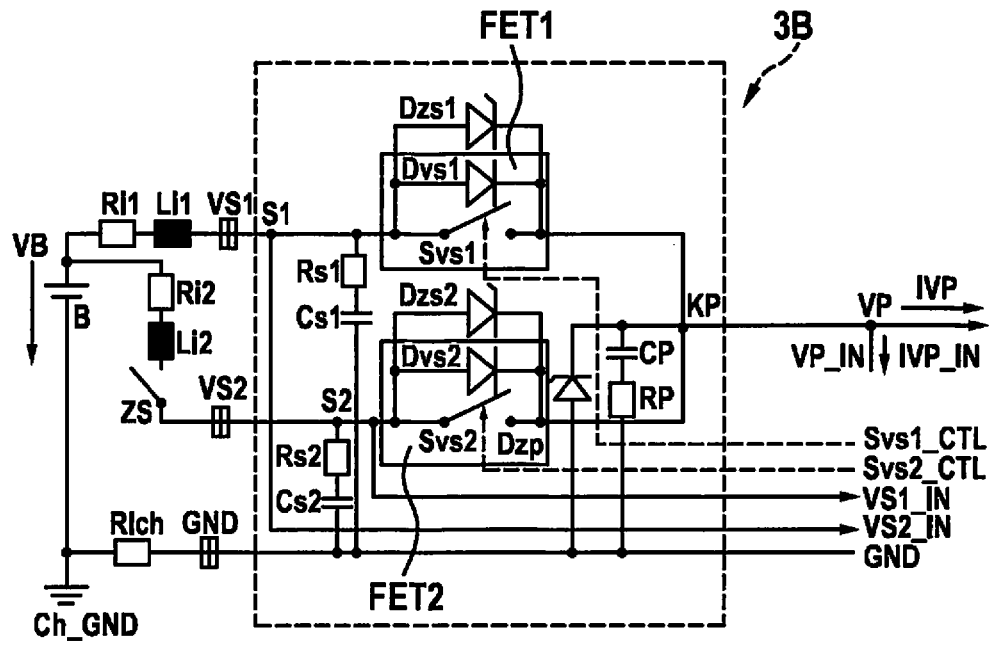
FIG. 3 shows a schematic circuit diagram of a second exemplary embodiment of a protective device for the multi-line supply units of the present invention from FIGS. 1 and 2, the protective device being connected to a power source.
Figure 8:
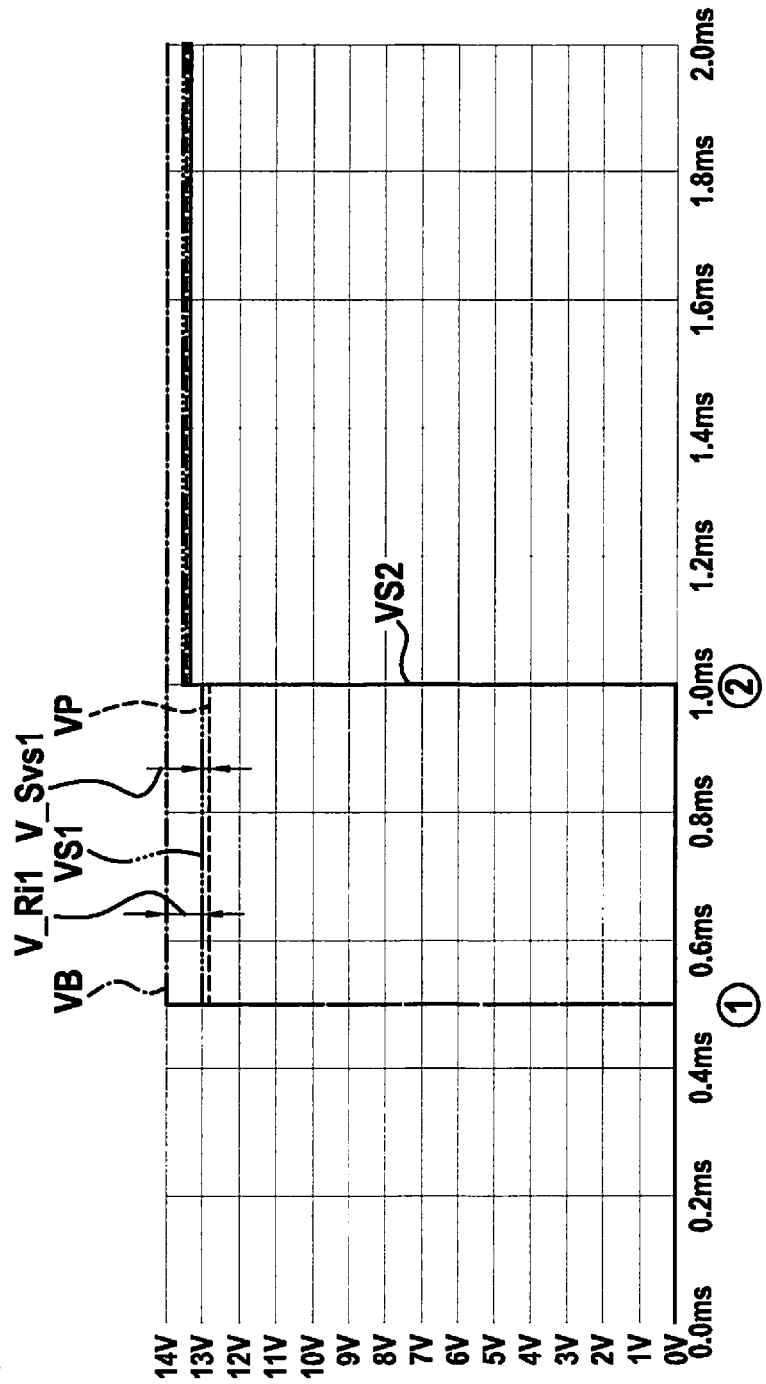
FIG. 8 shows a characteristic diagram of voltages during normal operation of the multi-line supply unit of the present invention for a vehicle control unit from FIG. 1, including the protective device from FIG. 3.

The characteristic diagram according to FIG. 8 shows a characteristic diagram of voltages during a simulation of normal operation of the multi-line supply unit 1A of the present invention for a vehicle control unit 2 from FIG. 1, including protective device 3B from FIG. 3. As is shown in FIGS. 3 and 8, vehicle voltage VB is applied at time 1, so that first line voltage VS1 is greater than the difference of reverse-polarity-protected supply voltage VP and the set hysteresis, and that first switch element Svs1 is closed. Since ignition lock ZS or the ignition switch is open at time 1, second line voltage VS2 is less than the difference of reverse-polarity-protected supply voltage VP and the set hysteresis, which means that second switch element Svs2 remains open. Thus, at time 1, first supply line S1 carries the total supply current IVP for the subsequent load RL, that is, a subsequent control unit. This results in first line voltage's VS1 being less than vehicle voltage VB by the voltage drop V_Ri1 at line resistor Ri of first supply line S1 caused by supply current IVP. In addition, reverse-polarity-protected supply voltage VP is less than first line voltage VS1 by the voltage drop V_Ri1 across first switch element Svs1. In the exemplary embodiment shown, the volume resistance of first switch element Svs1 has a value of approximately 10 mOhm and is therefore very much less than the line resistance Ri1 of approximately 100 mOhm. The volume resistance of first switch element Svs1 is a function of the size of the transistor used. Due to this, voltage drop V_Svs1 across switch element Svs1 is also very much less than voltage drop V_Ri1 across line resistor Ri, which means that line resistor Ri of first supply line S1, and no longer the bypassed, first damping diode Dvs1, is decisive for the magnitude of reverse-polarity-protected supply voltage VP. If ignition lock ZS, that is, the ignition switch, is closed at time 2, then, at the beginning, in currentless, second supply line S2, the condition prevails, that second line voltage VS2 corresponds to vehicle voltage VB and is greater than the difference of reverse-polarity protected supply voltage VP and the set hysteresis. Therefore, second switch element Svs2 in second supply line S2 is also closed at time 2. As a result, supply current IVP is provided via two supply lines S1, S2; line resistors Ri1, Ri2 of the supply lines, and no longer the reverse-polarity protection elements of protective device 3B, being substantially responsible for the distribution of the current in supply lines S1, S2. If, for example, a value of 10 mOhm is assumed for the volume resistances of switch elements Svs1, Svs2, a value of 107 mOhm is assumed for first line resistor Ri1, and a value of 127 Ohm is assumed for second line resistor Ri2, then first supply line S1 provides 54% of supply current IVP, and second supply line S2 supplies 46% of supply current IVP.

Figure 4:
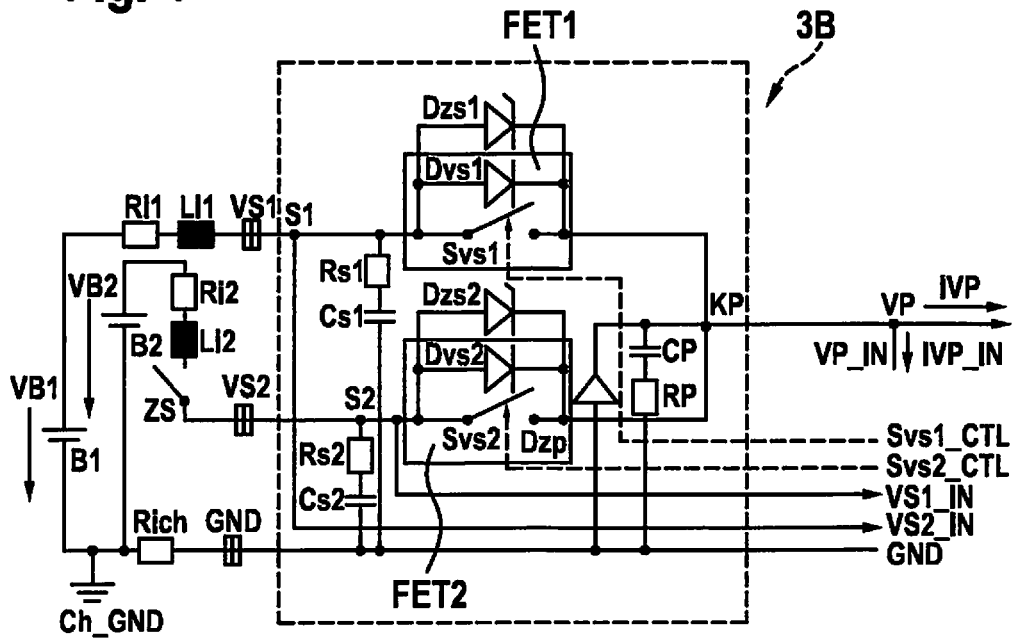
FIG. 4 shows a schematic circuit diagram of the protective device from FIG. 3, which is connected to two power sources.
Figure 5:
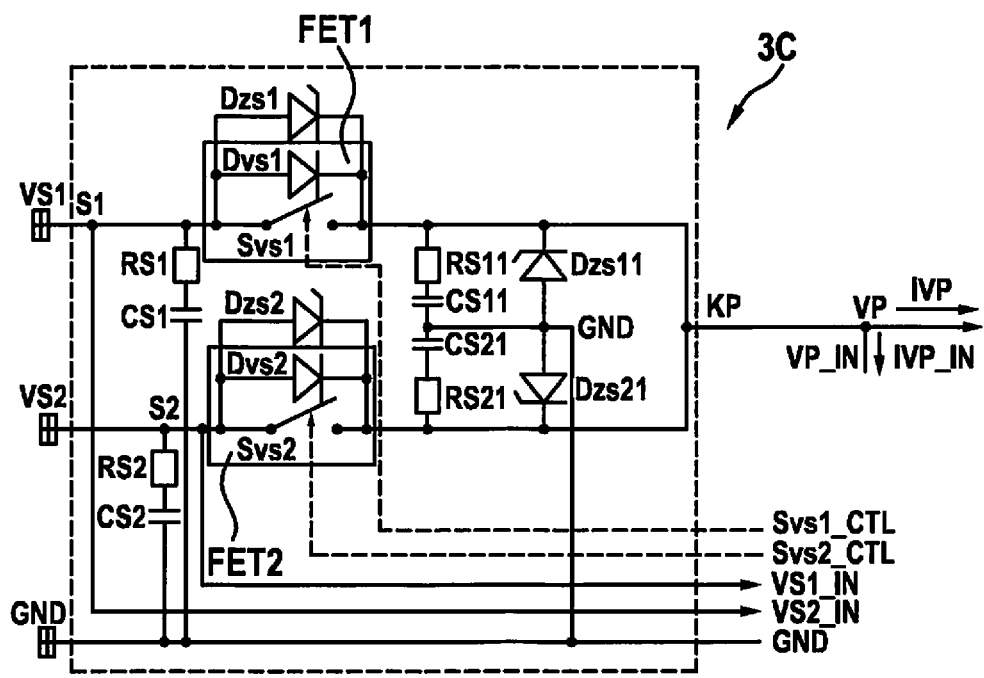
FIG. 5 shows a schematic circuit diagram of a third exemplary embodiment of a protective device for the multi-line supply units of the present invention from FIGS. 1 and 2.
Figure 9:
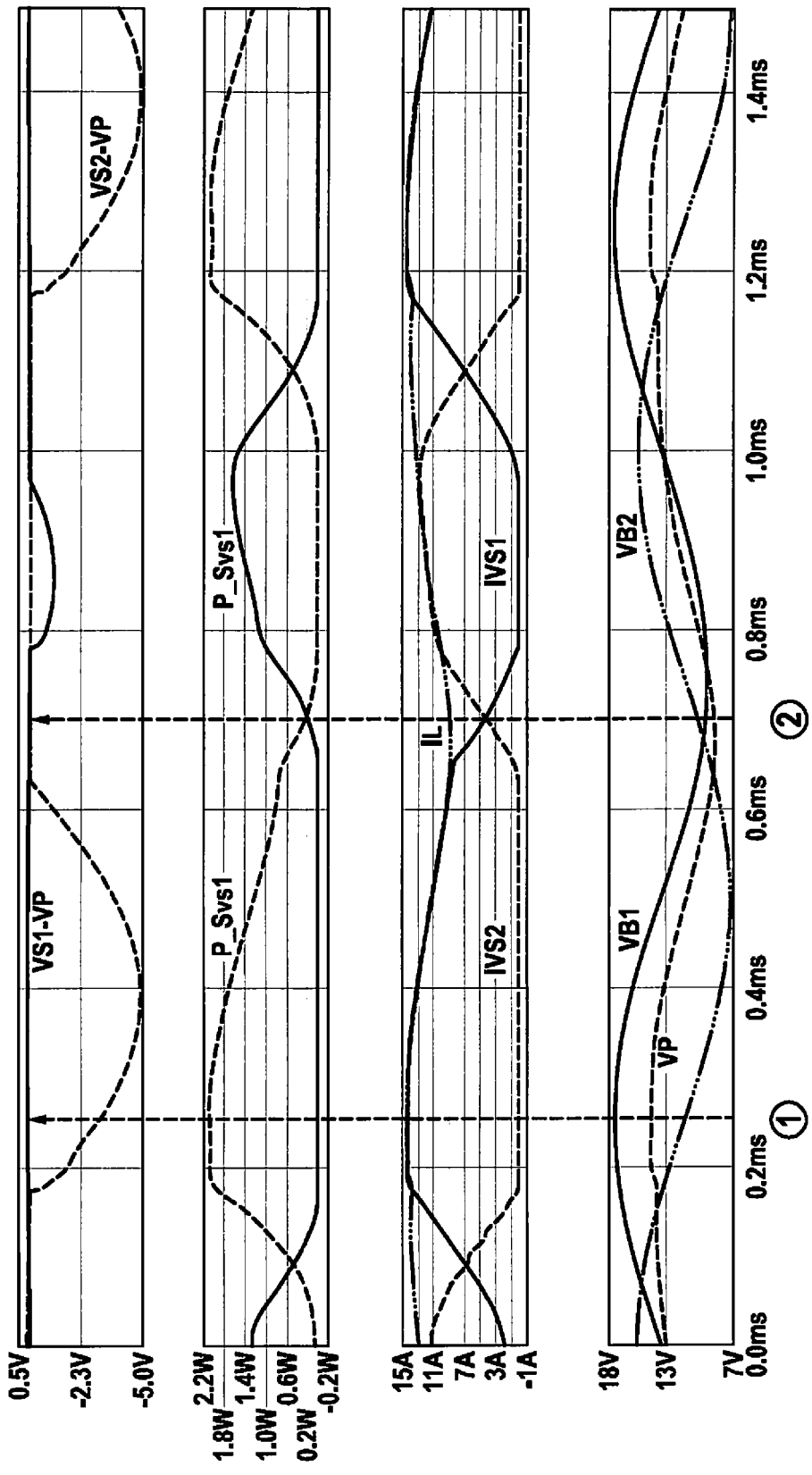
FIG. 9 shows a characteristic diagram of different variables of the multi-line supply unit of the present invention for a vehicle control unit from FIGS. 1 and 2, including the protective device from FIG. 4; the multi-line supply device having different steady components and being disturbed by a 1 kHz sinusoidal interference voltage.

The characteristic diagram of FIG. 9 shows different signal characteristics of multi-line supply unit 1A of the present invention for a vehicle control unit 2 from FIG. 1, including protective device 3B from FIG. 4; the two vehicle voltages VB1, VB2, which are applied to the two supply lines S1, S2, having different d.c. voltage components and each being disturbed by a sinusoidal interference voltage. The interference voltage may be produced, for example, by a vehicle generator. In the depicted simulation, first vehicle voltage VB1 has a d.c. voltage component of 13.5 V and a first interference voltage having an amplitude of 4 V and a frequency of 1 kHz. Second vehicle voltage VB2 includes a direct component of 11.5 V and a second interference voltage having an amplitude of 4 V and a frequency of 1 kHz; the first interference voltage and the second interference voltage having a phase shift of 90°.

As is further shown in FIG. 9, at time 1, first vehicle voltage VB1 is greater than second vehicle voltage VB2, and first line voltage VS1 is greater than the difference between reverse-polarity-protected supply voltage VP and the hysteresis. A result of this is that first switch element Svs1 is closed. Due to this, voltage drop VS1-VP over first supply line S1 is very low, and in spite of a high current Ivs1 of approximately 14 A in first supply line S1, power loss P_Svs1 of first switch element Svs1, at approximately 2 W, is extremely low. In the same conditions, the power loss of a comparable damping diode not having a parallel switch element Svs1 would lie between 7 W and 11 W. At the same time, at time 1, second vehicle voltage VB2 is less than the difference between reverse-polarity-protected supply voltage VP and the hysteresis. As a result, second switch element Svs2 is open. Due to this, no current IVS2 flows in second supply line S2, and a blocking voltage is applied to first damping diode Dvs2 of second supply line S2; the blocking voltage preventing feedback from first supply line S1 into second supply line S2. Consequently, the supply of power to control unit 2 at time 1 occurs exclusively via first supply line S1.

As is further shown in FIG. 9, at time 2, line voltages VS1, VS2 and reverse-polarity-protected supply voltage VP are close to each other, which means that due to the determining, ohmic line resistors Ri1, Ri2 of supply lines S1, S2, load current IL is distributed to the two supply lines S1, S2. Based on this current distribution, power losses P_Svs1, P_Svs2 of switch elements Svs1, Svs2 decrease considerably to a value of approximately 0.2 W. Voltage drop VS2-VP over the second supply line corresponds to voltage drop VS1-VP over first supply line S1 and, at 50 mV, is approximately three times smaller than voltage drop VS1-VP over first supply line S1 at time 1.

In summary, in specific embodiments of multi-line supply unit 1A, 1B, 1C of the present invention, no static feedback from one supply line S1, S2 to the other supply line S1, S2 even occurs in the case of dynamic voltage differences at the supply lines VS1, VS2 of the control unit. In addition, dynamic feedback is also limited in energy and is essentially restricted to the levels of capacitors Cs1, Cs2, Cp of the RC filters. Furthermore, power losses P_Svs1, P_Svs2 of switch elements Svs1, Svs2 are small and lie below 2.2 W. In spite of high currents IVS1, IVS2 in supply lines S1, S2 and resulting, high load current IL, voltage drops VS1-VP, VS2-VP over the supply lines are also low in the case of the active two-line, reverse-polarity protection.

Figure 10:
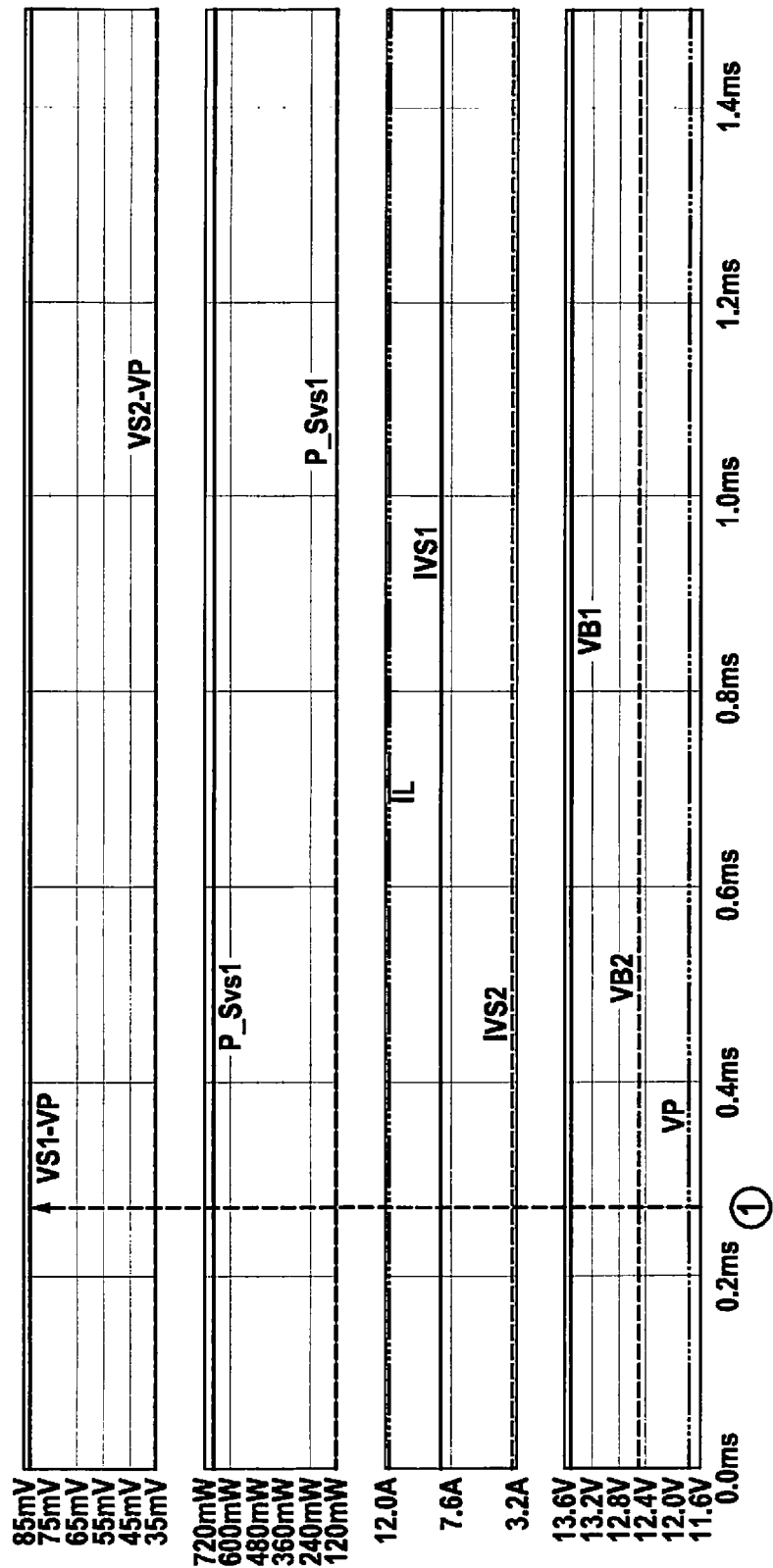
FIG. 10 shows a characteristic diagram of different variables of the multi-line supply unit of the present invention for a vehicle control unit from FIGS. 1 and 2, including the protective device from FIG. 4; the multi-line supply device having different steady components.

The characteristic diagram of FIG. 10 shows different signal characteristics of multi-line supply unit 1A of the present invention for a vehicle control unit 2 from FIG. 1, including protective device 3B from FIG. 4; the two vehicle voltages VB1, VB2, which are applied to the two supply lines S1, S2, having different d.c. voltage components and not being disturbed by interference voltages. In the depicted simulation, first vehicle voltage VB1 includes a d.c. voltage component of 13.5 V, and second vehicle voltage VB2 includes a d.c. voltage component of 12.5 V.

As is further shown in FIG. 10, first vehicle voltage VB1 is greater than second vehicle voltage VB2 at time 1. This produces a supply current IVP, of which approximately two thirds is made up of current IVS1 of first supply line S1 (IVS1≈8.2 A) and one third is made up of current IVS3 (IVS2≈3.5 A) of second supply line S2, for an assumed supply current IVP or IL of 11.75 A. In this case, it is simple to recognize that line resistances Ri1, Ri2 of supply lines S1, S2 are crucial to the current distribution of high-current control units, since internal impedances of control unit 2 make almost no difference due to the reduction in power loss. The advantage of specific embodiments of multi-line supply unit 1A, 1B, 1C according to the present invention is that in addition to the redundancy for signaling a power supply fault, with the reliable assumption of control by the driver over an at least semiautonomous vehicle function, a permanent reduction of power loss in protective device 3A, 3B, 3C, 3D is also achieved due to the current distribution. At 82 mV and 35 mV, voltage drops VS1-Vp, VS2-Vp over supply lines S1, S2 are extremely small. Due to that, in spite of high supply current IVP of IL=11.75 A, at 680 mW, power loss P_Svs1 in first switch element Svs1, and at 120 mW, power loss P_Svs2 in second switch element Svs2, are extremely small. The characteristic diagram from FIG. 8 was selected in order to show the states, which are to be expected over relatively long times in a customary supply situation.

As is further shown in FIGS. 1 through 6, in the depicted exemplary embodiments of protective device 3A, 3B, 3C, 3D, in each instance, a field-effect transistor FET1, FET2 forms first damping diode Dvs1, Dvs2 and corresponding switch element Svs1, Svs2 in the two supply lines S1, S2. In the exemplary embodiments represented, field-effect transistors FET1, FET2 are each constructed as a p-channel power MOSFET.

As is further shown in FIGS. 3 through 6, in the depicted exemplary embodiments of protective device 3B, 3C, 3D, in each instance, a second damping diode Dzs1, Dzs2 is in the two supply lines S1, S2, parallel to first damping diode Dvs1, Dvs2 and to switch element Svs1, Svs2. Second damping diodes Dzs1, Dzs2 protect switch elements Svs1, Svs2 and reduce a pulse loading of switch elements Svs1, Svs2. In this manner, switch elements Svs1, Svs2 may be protected from an ISO pulse loading, which may generate voltages of over 40 V across switch elements Svs1, Svs3. In the depicted exemplary embodiments, second damping diodes Dzs2, Dzs2 are configured as suppressor diodes (TSV) having an avalanche voltage in the range of 24 V to 40 V. Now if, for example, a negative, type-1 ISO 7637 pulse (−100 V with respect to ground GND, 2 ms, Ri=10 Ω)) occurs in a supply line S1, S1, for example, due to the operation of a seat heater, a window heater, etc., then, in the case of a normal control unit power supply state, a reverse-polarity-protected supply voltage VP having a value of approximately 12V is applied to common node KP for a moment. This produces a corresponding, peak line voltage VS1, VS2 of approximately −100 V. At the peak, this results in a voltage drop VSvs1 or (VS1-VP9, VSvs2 or VS2-VP) over corresponding switch element Svs1, Svs2 of approximately −112 V. Selecting a corresponding p-channel power MOSFET having a voltage endurance between the source and the drain of 100 V, and more in the case of a low forward resistance, is highly expensive and results in a high space requirement. The additional, second damping diodes Dzs1, Dzs2 allow the pulse loads of switch elements Svs1, Svs2 to be reduced markedly, which means that more cost-effective transistor types having a voltage-sustaining capability between source and drain of under 40 V and a low forward resistance may be used. Additional, second damping diodes Dzs1, Dzs2 may be omitted, if the MOSFET's used have a sufficient and specific, periodic avalanche energy. In this manner, the static reverse-polarity safety of control unit 2 against voltages up to 20 V is ensured, as is the active measures against the negative pulse loading.

As is further shown in FIGS. 3 and 4, in the depicted exemplary embodiments of protective device 3B, the outputs of the two supply lines S1, S2 are jointly connected to ground GND at a common node KP, via a third damping diode Dzp, which reduces a positive pulse loading of the two supply lines S1, S2. In the exemplary embodiments of protective device 3C, 3D represented in FIGS. 5 and 6, the outputs of the two supply lines S1, S2 are each individually connected to ground in front of common node KP, via a third damping diode Dzs11, Dzs21, which reduces a positive pulse loading of the two supply lines S1, S2. Third damping diodes Dzp, Dzs11, Dzs21 are used to protect against positive ISO pulses, including a load dump. If a positive pulse load occurs in a supply line S1, S2, then pulses over 30 V are clamped or limited at common node KP by third damping diodes Dzp, Dzs11, Dzs21. The avalanche voltage of third damping diode Dzp, Dzs11, Dzs21 may be selected to be in the range of 30 V to 42 V. Third damping diodes Dzp, Dzs11, Dzs21 produce cost-effective solutions having MOSFET's as switch elements Svs1, Svs2 and allow asymmetric clamping or limiting of negative supply pulses by the second damping diodes Dzs1, Dzs2, and of positive supply pulses by third damping diodes Dzp, Dzs11, Dzs21, which means that size or absorption power of the negative clamping elements may be decoupled from that of the positive clamping elements. In addition, the unidirectional clamping at common node KP unites increased protection from polarity reversal in the case of a defect of a line switch, with the objective of tripping the line circuit breaker before damage occurs in control unit 2.

As is shown in FIG. 6, in a particularly advantageous exemplary embodiment of multi-line supply unit 1C, passive filter 20 is constructed as a multi-line T filter 20C. In this case, in each instance, a first filter inductor LT1, LT2 is looped into the two supply lines S1, S2, between switch element Svs1, Svs2 and common node KP. A common, second filter inductor LT is looped in between common node KP and a filter output VZP. Using filter coils LT, LT1, LT2, a filter capacitor CT, as well as an output capacitor Cout, filter 20C may be adapted to the following switching controller 2.1 of control unit 2, having an operating frequency between 400 kHz and 4000 kHz. In particular, filter 20C has a buffer capacitor CμCT, which is constructed, for example, as a hybrid-polymer electrolytic capacitor having a very small ESR. Buffer capacitor CμCT is coupled to common node KP via an ohmic limiting resistor RμCT, which has a value between 0.1 and 1 Ohm and limits a peak current. In addition, buffer capacitor CμCT is connected to filter output VZP via a coupling diode DμCT. Coupling diode DμCT ensures rapid and low-resistance buffering of the input voltage of the switching converter in the case of a temporary voltage interruption of first vehicle voltage VB1 and/or of the second vehicle voltage. Coupling diode DμCT is preferably implemented as a Schottky diode.

Multi-line T filter 20C advantageously allows multi-line supply unit 1C to be coupled directly to switching controller 2.1 of control unit 2. Passive filter 20C damps disturbances to the vehicle electrical system, in particular, high-frequency sinusoidal interference from over 5 kHz to 20 kHz, suppresses the conducted interference of switching controller 2.1 on the vehicle electrical system and ensures the supply of power to control unit 2 in the case of sudden voltage drops in supply lines S1, S2. In addition, the first filter inductors LT1, LT2 integrated in supply lines S1, S2 produce a time delay in the build-up of a feedback current from supply line S1 to supply line S2, and vice versa. Furthermore, reverse-polarity-protected supply voltage VP may be measured after the inductive coupling, which means that an additional hysteresis is produced due to ohmic coil resistor RT1, RT2. In the depicted exemplary embodiment, if a short circuit to ground occurs in a supply line S1, S2, then, due to the limited switching rate of the checking of line voltage VS1, VS2 against reverse-polarity-protected supply voltage VP at common node KP and the limited opening speed of switch elements Svs1, Svs2, feedback of the energy stored in buffer capacitor CμCT may not be prevented completely, but may be improved markedly over the exemplary embodiment of multi-line supply unit 1B represented in FIG. 2.

Hardware control unit 12A, 12B, 12C or parts of hardware control unit 12A, 12B, 12C are switched "on" or "off" via an N_SL input, to which a sleep-mode control signal N_SL is applied. In order to detect line interruptions or check the quality of a supply line S1, S2, the control lines of control signals STR1_CTL, STR2_CTL are led to hardware control unit 10A, 10B, 10C. Thus, the monitoring processing unit 14A, 14B, 14C may open switch elements Svs1, Svs2 temporarily. Due to this, in response to a line interruption in a supply line S1, S2, line voltage VS1, VS2 falls below a predefined threshold value. This information is used for detecting faults in the redundant supply of power to the control units, with the object of giving the driver control again over the at least semiautonomous function in a timely manner or regaining the attention of the driver in time.

In the same manner, using these control lines and control signals STR1_CTL, STR2_CTL at voltage differences between vehicle voltages VB1, VB2 of under 1 V, when supply lines S1, S2 are checked a second time, only the corresponding switch element Svs1, Svs2 of the supply line S1, S2 to be checked is closed, and switch elements Svs1, Svs2 of the other supply lines S1, S2 are open. The response of corresponding line voltage VS1, VS2 in the loaded supply line S1, S2 to be checked may then be measured and evaluated. Since supply current IVP is concentrated on the supply line S1, S2 to be checked, it may therefore be checked if, under load at the current-carrying supply line S1, S2 to be checked, a sufficiently high line voltage VS1, VS2 is still present at the input.

If control unit 2 is in sleep mode, then sleep mode control signal N_SL has the low logical voltage level, and hardware control unit 12A, 12B, 12C absorbs only a very low supply current IVP at terminal VP_IN, which is considerably lower than 10 μA. In the same manner, no significant current flows into terminals VS1_IN, VS2_IN, as well. In other words, the current flowing into the terminals is also very much less than 10 μA. In addition, in sleep mode, switch elements Svs1, Svs2 are in their "default state," that is, open. Control unit 1, itself, is not active in sleep mode and absorbs only a small supply current from common node KP, which is less than 100 μA. Thus, the voltage drop, which first damping diodes may cause, is insignificant. If control unit 2 is awoken, then sleep-mode control signal N_SL changes to the high logical level, and hardware control unit 12A, 12B, 12C is activated.

Figure 7:
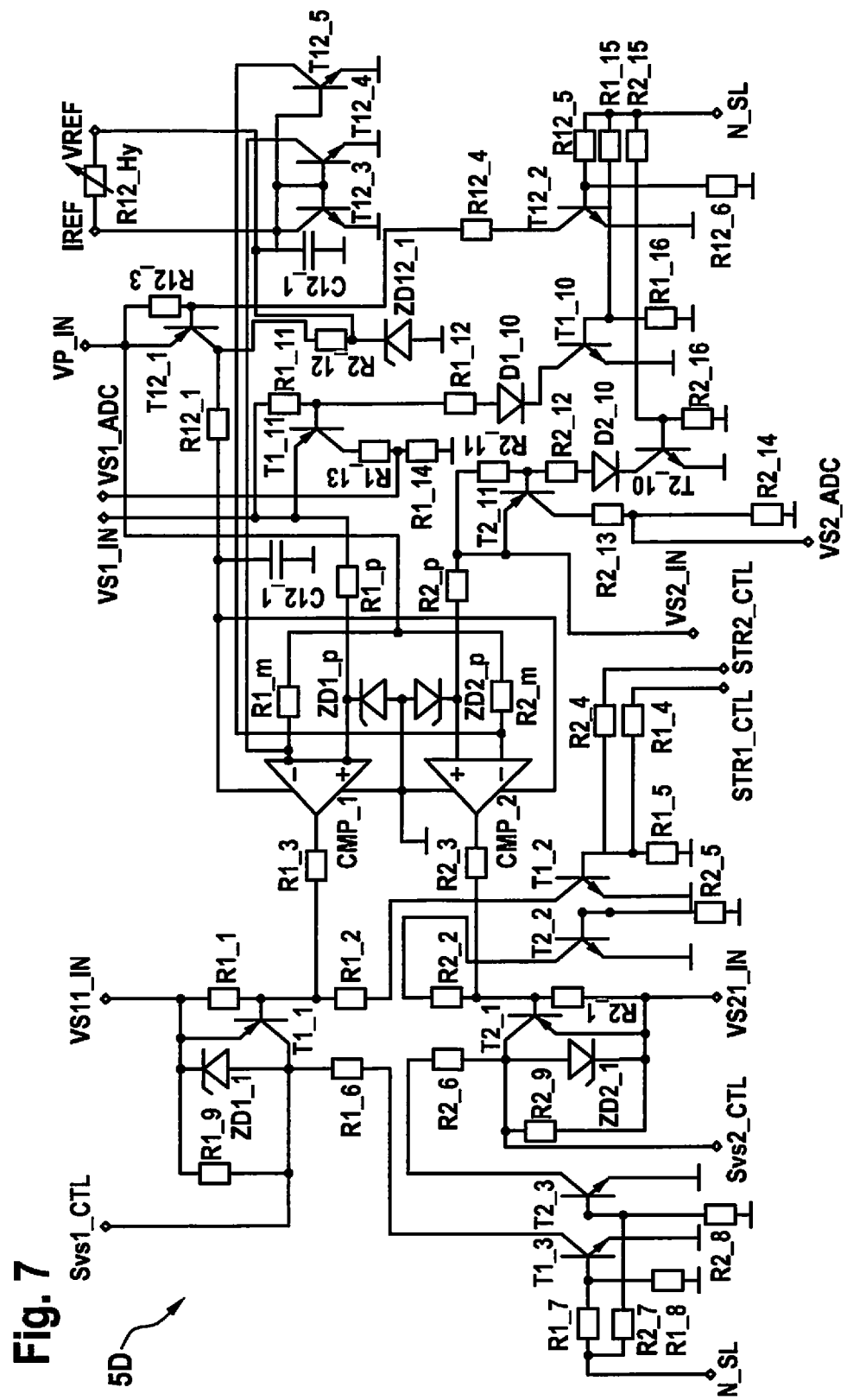
FIG. 7 shows a schematic circuit diagram of an exemplary embodiment of a hardware control unit for an evaluation and control unit of the multi-line supply unit of the present invention for a vehicle control unit from FIG. 6.

As is shown in FIGS. 6 and 7, the field-effect transistors FET1, FET2 implemented in the form of p-channel power MOSFET's conduct in the forward direction via bulk diodes Dsv1, Dsv2, between the drain and the source. These field effect transistors FET1, FET2 are controlled, using a positive source-gate voltage, which is synonymous with connecting the respective gate to ground via control lines of control signals Svs1_CTL, Svs2_CTL. Since field-effect transistors FET1, FET2 allow, as a rule, a maximum source-gate voltage of 20 V and, in order to increase the switching speed, the source-gate voltages are each limited to a value of, for example, 5.1 V by a Zener diode ZD1_1, ZD2_1 situated in hardware control unit 10C. A source-gate bleeder resistor R1_9, R2_9 (e.g., 100 kOhm) is positioned in parallel with this Zener diode ZD1_1, ZD2_1, respectively, in order to be able to reliably block corresponding switch element Svs1, Svs2 in sleep mode. In the case of continuous supply of power in supply lines S1, S2, in order that no current may flow through Zener diodes ZD1_1, ZD2_1 in sleep mode, the control lines of control signals Svs1_CTL, Svs2_CTL are constructed to be switchable by sleep-mode control signal N_SL via transistors T1_3, T2_3. Resistors R1_6, R2_6 (e.g., 5.1 kOhm) are used for limiting current in the control lines of control signals Svs1_CTL, Svs2_CTL in the case of an active control unit 2, which allows a voltage VS11, VS21 in the range of 5 V to 36 V in front of first filter inductors LT1, LT2_and, therefore, at the terminals of hardware control unit 10C, as well. Resistors R1_7 (e.g., 23.7 kOhm), R1_8 (e.g., 51.1 kOhm), R2_7 (e.g., 23.7 kOhm), R2_8 (e.g., 51.1 kOhm) form the base dividers for NPN control transistors T1_3, T2_3. Line voltages VS1, VS2 are acquired at hardware control unit 10C via terminals VS1_IN, VS2_IN and are forwarded, via switchable transistors T1_11, T2_11, to corresponding voltage dividers R1_13 (e.g., 75 kOhm), R1_14 (e.g., 8.25 kOhm), and R2_13 (e.g., 75 kOhm), R2_14 (e.g., 8.25 kOhm), respectively. Divided signals VS1_ADC, VS2_ADC are forwarded to processing unit 14C. PNP transistors T1_11, T2_11 are switchable, in order not to generate any measuring-divider current to ground from line voltages VS1, VS2. Thus, these transistors T1_11, T2_11 are switched through NPN control transistors T1_10, T2_10 with the aid of sleep-mode control signal N_SL. Sleep-mode control signal N_SL has a low logical level in sleep mode and a high logical level in normal mode. Since line voltages VS1, VS2 are measured in front of protective device 3D, the switching stages are protected from polarity reversal by signal diodes D1_10, D2_10, and resistors R1_12, R2_12 (e.g., 40.2 kOhm) are used for limiting current. Resistors R1_11, R2_11 (e.g., 51.1 kOhm) are used as base-emitter bleeder resistors. Resistors R1_15, R1_16 and R2_15, R2_16 (e.g., 23.7 kOhm, 51.1 kOhm and 23.7 kOhm, 51.1 kOhm, respectively) form a base voltage divider of NPN control transistors T1_10, T2_10, respectively.

In the passive filter, supply lines S1, S2 are interconnected via first filter inductors LT1, LT2_and generate reverse-polarity-protected supply voltage VP at common node KP. Reverse-polarity-protected supply voltage VP is supplied to hardware control unit 10C at terminal VP_IN. A positive supply voltage is supplied to comparators CMP_1, CMP_2 at corresponding, positive supply pins, via a PNP switching transistor T12_1 and a low-pass filter R12_1, C12_1 (e.g., 10 Ohm, 10 μF). Using a control transistor T12_2, this switching transistor T12_1 is also controllable by sleep-mode control signal N_SL. Thus, in the sleep mode of the control unit, no current is drawn from the line voltage(s) VS1, VS2 constantly present, in order to power comparators CMP_1, CMP_2. A resistor R12_4 (e.g., 40.2 kOhm) is used for limiting current in the control path of switching transistor T12_ 1. A resistor R12_3 (e.g., 51.1 kOhm) is used as a base-emitter bleeder resistor of transistor T12_1. Resistors R12_5, R12_6 (e.g., 23.7 kOhm, 51.1 kOhm) form a base divider of NPN control transistor T12_2.

Reverse-polarity-protected supply voltage VP of coupled supply lines S1, S2 is applied to negative inputs of comparators CMP_1, CMP_2 via series resistors R1_m, R2_m (e.g., 100 Ω). Line voltages VS1, VS2 at the inputs of supply lines S1, S2 are applied to positive inputs of comparators CMP_1, CMP_2 via terminals VS1_IN, VS2_IN and series resistors R1_p, R2_p (e.g., 5.1 kOhm). For protection against dangerous positive and/or negative voltages, as well as against polarity reversal, the positive inputs of comparators CMP_1, CMP_2 are protected by unidirectional Zener diodes ZD1_10, ZD2_10, respectively, which allow, for example, a clamping voltage of 27 V. Preferably, the clamping voltages of Zener diodes ZD1_10, ZD2 20 should be selected to lie below the clamping voltages of damping diodes Dzs11, Dzs21, Dzp, in order that at a high, positive pulse loading in the vehicle electrical system, switch elements Svs1, Svs2 of supply lines S1, S2 are forcibly opened and the coupling of control unit 2 only takes place via first and second damping diodes Dvs1, Dvs2, Dzs1, Dzs2 of the two supply lines S1, S2. This allows the risk to be reduced in the case of a load dump. Open-collector outputs of comparators CMP_1, CMP_2 are led to PNP switching transistors T1_1, T2_1 via current-limiting resistors R1_3, R2_3 (e.g., 7.5 kOhm). These switching transistors T1_1, T2_1 are positioned in such a manner, that in the case of triggering, they short-circuit the source-gate voltage of field-effect transistors FET1, FET2. In this manner, the blocking of field-effect transistors FET1, FET2 may be forced, and supply lines S1, S2 may be converted to the reverse-polarity-protected state. The comparators CMP_1, CMP_2 used preferably have a "common mode range," which may lie, for example, 44 V over an electric potential at the grounded connection of comparators CMP_1, CMP_2, irrespective of the positive supply voltage of the comparators.

In order to block field-effect transistors FET1, FET2 in supply lines S1, S2, in addition to comparators CMP_1, CMP_2, PNP switching transistors T1_1, T2_1 may be activated by control signals STR1_CTL, STR2_CTL of processing unit 14 with the aid of NPN control transistors T1_2, T2_2 and, therefore, may force a transition of supply lines S1, S2 to reverse-polarity-protected operation via first damping diodes Dvs1, Dvs2. Resistors R1_2, R2_2 (e.g., 7.5 kOhm) are used to limit current during the activation. Resistors R1_4, R1_5 and R2_4, R2_5 (e.g., 23.7 kOhm, 51.1 kOhm and 23.7 kOhm, 51.1 kOhm, respectively) are used as base voltage dividers of NPN control transistors T1_2, T2_2, respectively. A Zener diode ZD12_1 (e.g., 5.1 V) forms an optional reference voltage VREF of, for example, 5.1 V, which results from the supply voltage VP at the collector of T12_1, switched by sleep-mode control signal N_SL, with the aid of a series resistor R12_2 (e.g., =7.5 kOhm); a capacitor C12_1 being connected in parallel for the purpose of filtering. A reference current is determined by reference voltage VREF and optional resistor R12_Hy. This is supplied to a current mirror T12_3. Mirror currents IREF are decoupled by transistors T12_4, T12_5 and supplied to the negative inputs of comparators CMP_1, CMP_2. An adjustable hysteresis of comparators CMP_1, CMP_2 is formed together with resistors R1_m, R2_m.

If sleep-mode control signal N_SL and control signals STR1_CTL, STR2_CTL each have the low logical level, then hardware control unit 10C is not active and no current or an irrelevantly small amount of current in the μA range is consumed at terminals VS1_IN, VS2_IN, VS11_IN, VS21_IN, VP_IN of hardware control unit 10C. In this manner, field-effect transistors FET1, FET2 are switched off, and line voltages VS1, VS2 are protected from polarity reversal by first damping diodes Dsv1, Dsv2 and/or parallelly situated, unidirectional, second damping diodes Dzs1, Dzs2 and relayed to passive filter 20C; feedback from one supply line S1, S2 to the other supply line S1, S2 not being possible.

If a switch is made to normal operation having a first line voltage VS1 of 14 V, a second line voltage VS2 of 14 V, a first line resistance Ri1 of 200 mΩ), a second line resistance Ri2 of 200 mΩ) and sleep-mode control signal N_SL on a high logical voltage level, and control signals STR1_CTL, STR2_CTL on a low logical voltage level, then the voltage at the negative input of first comparator CMP_1 is less than line voltage VS1 at the positive input of first comparator CMP_1 by the voltage drop between first line voltage VS1 and reverse-polarity-protected supply voltage VP, plus a first hysteresis. In an analogous manner, the voltage at the negative input of second comparator CMP_2 is less than line voltage VS2 at the positive input of second comparator CMP_2 by the voltage drop between first line voltage VS1 and reverse-polarity-protected supply voltage VP, plus a second hysteresis. Due to this, the outputs of the two comparators CMP_1, CMP_2 are blocked. Thus, the PNP switching transistors T1_1, T2_1 for controlling field-effect transistors FET1, FET2 are blocked, as well. Since sleep-mode control signal N_SL is at a high logical voltage level during normal operation, control transistors T1_3, T2_3 are conductive. Consequently, the gates of field-effect transistors FET1, FET2 are switched to ground, which means that these become conductive. The present voltage drops between line voltages VS1, VS1 and reverse-polarity-protected supply voltage VP, which, in the open state of field-effect transistors FET1, FET2, are caused mainly by first damping diodes Dvs1, Dvs2, are consequently reduced sharply by the parallelly situated, conducting field-effect transistors FET1, FET2.

In active operation, line resisters Ri1, Ri2 are responsible for the current distribution in supply lines S1, S2, if vehicle voltages VB1, VB2 are of equal magnitude.

Thus, in specific embodiments of the operating method of the present invention for a multi-line supply unit, in each instance, a line voltage VS1, VS2 at the inputs of the at least two supply lines S1, S2, respectively, is measured and evaluated, and a reverse-polarity-protected voltage VP at common node KP is measured and evaluated. In this connection, switch elements Svs1, Svs2 in the at least two supply lines S1, S2 are controlled as a function of the evaluation, using corresponding control signals Svs1_CTL, Svs2_CTL.

In addition, processing unit 14C may compare individual line voltages VS1, VS2 to each other and/or to reverse-polarity-protected supply voltage VP and generate control signals Svs1_CTL, Svs2_CTL for the at least one switch element Svs1, Svs2 as a function of the comparisons, using a hardware control unit 12A, 12B, 12C. Thus, the at least two supply lines S1, S2 may be checked individually during operation as a function of predefined conditions. In order to detect power-supply faults, the at least two supply lines S1, S2 may be checked individually by processing unit 14C at predefined intervals, and/or when a voltage difference between line voltages VS1, VS2 exceeds a predefined magnitude. Without these checking functions, line voltage S1, S2 of functional supply line S1, S2 may also be applied to the input of interrupted supply line S1, S2 due to the coupling at common node KP and conductive switch elements Svs1, Svs2 and, therefore, may not be detected by the voltage check.

Thus, in normal operation, processing unit 14C may open field-effect transistors FET1, FET2, using control signals STR1_CTL, STR2_CTL, which are set to a high logical level, which means that an interrupted supply of power to the lines may be detected. Thus, in a first check of the two supply lines S1, S2, processing unit 14C may open the at least one switch element Svs1, Svs2 of the supply line S1, S2 to be checked, and the reactions of corresponding line voltage VS1, VS2 and reverse-polarity-protected supply voltage VP at common node KP may be measured and evaluated. In this connection, a line interruption in the supply line S1, S2 to be checked may be detected, if, in response to an open switch element Svs1, Svs2, corresponding line voltage VS1, VS2 is below a predefined, minimum limiting value in the range of 0 to 6 V. This means, for example, that first control signal STR1_CTL is set to the low logical voltage level and second control signal STR2_CTL is set to the high logical voltage level, in order to check second supply line S2 for a line interruption. Since second supply line S2 experiences a decrease in voltage around the first damping diode Dvs2 and/or second damping diode Dzvs2 now active, supply current IVP is concentrated on first supply line S1. In this state, if first line voltage VS1 is acquired as first voltage VS1_ADC and second line voltage VS2 is acquired as second voltage VS2_ADC, then second voltage VS2_ADC corresponds approximately to second vehicle voltage VB2, if line current Isv2 is not flowing in second supply line S2. First voltage VS1_ADC corresponds to first line voltage VS1 at a maximum loading. A line interruption to second supply line S2 may be detected, if a voltage markedly lower than the vehicle voltage VB2 to be expected is applied to the input of second supply line S2.

Subsequently, first control signal STR1_CTL may be set to the high logical voltage level, and second control signal STR2_CTL may be set to the low logical voltage level, in order to check first supply line S1. This means, for example, that supply current IVP is concentrated on second supply line S2, since first supply line S1 experiences a reduction in voltage around the first damping diode Dvs1 and/or second damping diode Dzvs1 now active. In this state, if first line voltage VS1 is acquired as first voltage VS1_ADC and second line voltage VS2 is acquired as second voltage VS2_ADC, then first line voltage VS1_ADC corresponds approximately to first vehicle voltage VB1, if line current Isv1 is not flowing in first supply line S1. Second voltage VS2_ADC corresponds to second line voltage VS2 at a maximum loading. A line interruption to first supply line S1 may be detected, if a voltage markedly lower than the first vehicle voltage VB1 to be expected is applied to the input of first supply line S1.

Using knowledge of no-load voltage values of vehicle voltages VB1, VB2 and line voltages VS1, VS2 of supply lines S1, S2 at maximum loading, processing unit 14C may deduce the quality of supply line S1, S2 and provide a maintenance information item. Alternatively, vehicle voltages VB1, VB2 of processing unit 14C may also be provided by central vehicle systems over different communication paths (Ethernet, FlexRay, CAN, LIN). In this connection, poor quality may be detected due to the calculated internal resistance's exceeding a predefined limiting value. The internal resistance may increase, that is, become worse, over the service life, for example, due to corrosion at the contact points.

If the no-load voltage values of vehicle voltages VB1, VB2 are markedly different, then, in the case of linked supply lines S1, S2 not having active, first damping diodes Dsv1, Dsv2, there is a constant risk of feedback, if the two switch elements Svs1, Svs2 are controlled so as to be conductive. To prevent this effect, line voltages VS1, VS2 at terminals VS1_IN, VS2_IN of hardware control unit 10C are measured and applied to the positive inputs of comparators CMP_1, CMP_2. The linkage of line voltages VS1, VS2 in the form of reverse-polarity-protected supply voltage VP is applied, in each instance, to the negative inputs of comparators CMP_1, CMP_2. In the exemplary embodiment represented in FIG. 6, this linkage of supply lines S1, S2 takes place in passive supply filter 20C. Consequently, a first filter inductor LT1, LT2_is active in each supply line, which means that the increase in feedback current is also damped dynamically, and the final reaction time of actual comparators CMP_1, CMP_2 may be compensated for completely or partially in an advantageous manner. For example, if line voltage VS2 decreases and reverse-polarity-protected supply voltage VP+hysteresis becomes greater than line voltage VS2 at the input of the second supply line, that is, the voltage at terminal VS2_IN, then the output of second comparator CMP_2 switches to ground and activates PNP switching transistor T2_1, which connects the gate and the source of second field-effect transistor FET2 and therefore opens second switch element Svs2. In this manner, second supply line S2 goes into a diode coupling, so that node KP may not release any permanent current backwards into second supply line S2.

Processing unit 14C may then generate a warning signal and output it via an acoustic and/or optical output unit, if a line interruption and/or a problem and/or poor quality is detected in at least one of the two supply lines S1, S2. Additionally, or as an alternative, processing unit 14C may store the warning message and output it at a later time via a diagnostic interface. In this manner, the specific, at least semiautonomous function may be returned to the driver again, and/or rapid service may be initiated without there being an urgent necessity for it, since due to the redundant, two-line power supply, no unwanted functional limitation occurs initially.

What is claimed is:

1. A multi-line supply unit for a vehicle control unit, comprising:
at least two supply lines, which are each connected to at least one vehicle voltage source at an input and are brought together at a common node at an output;
a protective device which includes, in each of the at least two supply lines, at least one first damping diode, which is looped into the at least two supply lines in the forward direction, between the at least one vehicle voltage source and the node, and at least one switch element looped into each of the at least two supply lines, respectively, in parallel with the at least one damping diode, respectively; and
an evaluation and control unit configured to measure and evaluate a line voltage at the inputs of the at least two supply lines, respectively, and to measure and evaluate a reverse-polarity-protected supply voltage at the common node, and to control the switch elements in the at least two supply lines as a function of the evaluation, using corresponding control signals;
wherein the evaluation and control unit includes a processing unit configured to check the at least two supply lines individually as a function of predefined conditions, and wherein for checking the at least two supply lines, the processing unit being configured to generate at least one control signal and to output the at least one control signal the hardware control unit, which, in response to the at least one control signal, is configured to generate the corresponding control signals for the at least one switch element and to output the corresponding control signals.

2. The multi-line supply unit as recited in claim 1, wherein the evaluation and control unit is configured to compare the individual line voltages to each other and/or to the reverse-polarity-protected supply voltage, and to generate the control signals for the at least one switch element, as a function of the comparisons, using a hardware control unit.

3. The multi-line supply unit as recited in claim 2, wherein the evaluation and control unit is configured to close the at least one switch element, using the control signals generated by the hardware control unit, if a difference between the corresponding line voltage and the reverse-polarity-protected supply voltage at the common node exceeds a predefined, first threshold value.

4. The multi-line supply unit as recited in claim 3, wherein the evaluation and control unit is configured to open the at least one switch element, using the control signals generated by the hardware control unit, if the difference between the corresponding line voltage and the reverse-polarity-protected supply voltage at the common node falls below a predefined, second threshold value.

5. The multi-line supply unit as recited in claim 4, wherein a difference between the first threshold value and the second threshold value is set using a variable resistor in the hardware control unit.

6. The multi-line supply unit as recited in claim 1, wherein the processing unit is configured to generate a warning signal and/or stores a fault, and configured to output the warning signal or the fault, via an acoustic unit and/or an optical output unit and/or a diagnostic interface, if the processing unit detects a line interruption and/or a problem and/or poor quality, in the at least two supply lines.

7. The multi-line supply unit as recited in claim 1, wherein in the at least two supply lines, a field-effect transistor forms the at least one first damping diode and the at least one switch element, respectively.

8. The multi-line supply unit as recited in claim 1, wherein at least one second damping diode is situated in at least two supply lines, in each instance, in parallel with the at least one first damping diode and with the at least one switch element, and is configured to reduce a pulse loading of the at least one switch element.

9. The multi-line supply unit as recited in claim 1, wherein the inputs of the at least two supply lines are connected to ground and damped by at least one RC element, which includes an ohmic resistor, respectively, and a capacitor, respectively.

10. The multi-line supply unit as recited in claim 1, wherein the outputs of the at least two supply lines are each connected to ground and damped individually in front of the common node or jointly at the common node, by at least one RC element, which includes an ohmic resistor and a capacitor.

11. The multi-line supply unit as recited in claim 1, wherein the common node is connectable to the control unit via a passive filter.

12. The multi-line supply unit as recited in claim 11, wherein the passive filter has an energy reserve, which is configured to compensate for a sudden, short-term voltage drop.

13. A multi-line supply unit for a vehicle control unit, comprising:
at least two supply lines, which are each connected to at least one vehicle voltage source at an input and are brought together at a common node at an output;
a protective device which includes, in each of the at least two supply lines, at least one first damping diode, which is looped into the at least two supply lines in the forward direction, between the at least one vehicle voltage source and the node, and at least one switch element looped into each of the at least two supply lines, respectively, in parallel with the at least one damping diode, respectively; and
an evaluation and control unit configured to measure and evaluate a line voltage at the inputs of the at least two supply lines, respectively, and to measure and evaluate a reverse-polarity-protected supply voltage at the common node, and to control the switch elements in the at least two supply lines as a function of the evaluation, using corresponding control signals;
wherein the outputs of the at least two supply lines are connected to ground, in each instance, individually in front of the common node or jointly at the common node, across at least one third damping diode, which is configured to reduce a positive pulse loading of the at least two supply lines, and wherein the at least one third damping diode limits a negative voltage occurring at the common node to a specified value and trips an electrical vehicle circuit breaker in response to a defective line switch in the case of polarity reversal.

14. The multi-line supply unit as recited in claim 13, wherein the evaluation and control unit includes a processing unit configured to check the at least two supply lines individually as a function of predefined conditions, and wherein for checking the at least two supply lines, the processing unit being configured to generate at least one control signal and to output the at least one control signal the hardware control unit, which, in response to the at least one control signal, is configured to generate the corresponding control signals for the at least one switch element and to output the corresponding control signals.

15. A multi-line supply unit for a vehicle control unit, comprising:
at least two supply lines, which are each connected to at least one vehicle voltage source at an input and are brought together at a common node at an output;
a protective device which includes, in each of the at least two supply lines, at least one first damping diode, which is looped into the at least two supply lines in the forward direction, between the at least one vehicle voltage source and the node, and at least one switch element looped into each of the at least two supply lines, respectively, in parallel with the at least one damping diode, respectively; and
an evaluation and control unit configured to measure and evaluate a line voltage at the inputs of the at least two supply lines, respectively, and to measure and evaluate a reverse-polarity-protected supply voltage at the common node, and to control the switch elements in the at least two supply lines as a function of the evaluation, using corresponding control signals;
wherein the common node is connectable to the control unit via a passive filter;
wherein the passive filter is a multi-line T filter, and wherein, in each instance, a first filter inductor is looped into the at least two supply lines, between the switch element and the common node, and wherein a common, second filter inductor is looped in between the common node and a filter output.

16. An operating method for a multi-line supply unit, the multi-line supply unit including at least two supply lines, which are each connected to at least one vehicle voltage source at an input and are brought together at a common node at an output, a protective device which includes, in each of the at least two supply lines, at least one first damping diode, which is looped into the at least two supply lines in the forward direction, between the at least one vehicle voltage source and the node, and at least one switch element looped into each of the at least two supply lines, respectively, in parallel with the at least one damping diode, respectively, and an evaluation and control unit configured to measure and evaluate a line voltage at the inputs of the at least two supply lines, respectively, and to measure and evaluate a reverse-polarity-protected supply voltage at the common node, and to control the switch elements in the at least two supply lines as a function of the evaluation, using corresponding control signals, the operating method comprising:
measuring and evaluating a line voltage at the inputs of the at least two supply lines, respectively, and a reverse-polarity-protected supply voltage at the common node; and
controlling the switch elements in the at least two supply lines as a function of the evaluation, using the corresponding control signals;

wherein the at least two supply lines are checked individually during operation, as a function of predefined conditions.

17. The operating method as recited in claim 16, wherein individual line voltages at the inputs are compared to each other and/or to the reverse-polarity-protected supply voltage, and the corresponding control signals for the at least one switch element are generated as a function of the comparisons, using a hardware control unit.

18. The operating method as recited in claim 16, wherein the at least two supply lines are checked individually at predefined intervals, and/or if a voltage difference between the line voltages exceeds a predefined magnitude.

19. The operating method as recited in claim 16, wherein in a first check of the at least two supply lines, the at least one switch element of a supply line to be checked is opened, and responses of the corresponding line voltage and of the reverse-polarity-protected supply voltage at the common node, are measured and evaluated.

20. The operating method as recited in claim 19, wherein a line interruption in the supply line to be checked is detected, if, in response to an open switch element, the corresponding line voltage is below a predefined, minimum limiting value.

21. The operating method as recited in claim 19, wherein in a second check of the at least two supply lines, only the corresponding switch element of the supply line to be checked is closed, and the switch elements of the other supply lines are open, and a response of the corresponding line voltage in a loaded state of the supply line to be checked being measured and evaluated.

22. The operating method as recited in claim 21, wherein a problem in the loaded supply line to be checked is detected, if, in response to a closed switch element, the corresponding line voltage lies below a predefined limiting load value.

23. An operating method for a multi-line supply unit, the multi-line supply unit including at least two supply lines, which are each connected to at least one vehicle voltage source at an input and are brought together at a common node at an output, a protective device which includes, in each of the at least two supply lines, at least one first damping diode, which is looped into the at least two supply lines in the forward direction, between the at least one vehicle voltage source and the node, and at least one switch element looped into each of the at least two supply lines, respectively, in parallel with the at least one damping diode, respectively, and an evaluation and control unit configured to measure and evaluate a line voltage at the inputs of the at least two supply lines, respectively, and to measure and evaluate a reverse-polarity-protected supply voltage at the common node, and to control the switch elements in the at least two supply lines as a function of the evaluation, using corresponding control signals, the operating method comprising:
- measuring and evaluating a line voltage at the inputs of the at least two supply lines, respectively, and a reverse-polarity-protected supply voltage at the common node; and
- controlling the switch elements in the at least two supply lines as a function of the evaluation, using the corresponding control signals;
- wherein individual line voltages are compared to each other and, in each instance, to a vehicle voltage of the vehicle voltage source, and wherein a magnitude of an internal resistance of the corresponding supply line is deduced based on the comparison.

24. The operating method as recited in claim 23, wherein the at least two supply lines are checked individually during operation, as a function of predefined conditions.

25. An operating method for a multi-line supply unit, the multi-line supply unit including at least two supply lines, which are each connected to at least one vehicle voltage source at an input and are brought together at a common node at an output, a protective device which includes, in each of the at least two supply lines, at least one first damping diode, which is looped into the at least two supply lines in the forward direction, between the at least one vehicle voltage source and the node, and at least one switch element looped into each of the at least two supply lines, respectively, in parallel with the at least one damping diode, respectively, and an evaluation and control unit configured to measure and evaluate a line voltage at the inputs of the at least two supply lines, respectively, and to measure and evaluate a reverse-polarity-protected supply voltage at the common node, and to control the switch elements in the at least two supply lines as a function of the evaluation, using corresponding control signals, the operating method comprising:
- measuring and evaluating a line voltage at the inputs of the at least two supply lines, respectively, and a reverse-polarity-protected supply voltage at the common node; and
- controlling the switch elements in the at least two supply lines as a function of the evaluation, using the corresponding control signals;
- wherein a warning signal is generated, and/or a fault is stored, and wherein the warning signal and/or the fault is outputted via an acoustic and/or an optical output unit and/or a diagnostic interface, if a line interruption and/or a problem and/or poor quality is detected in the at least two supply lines, wherein the poor quality being detected in that an internal resistance exceeds a predefined limiting value.

\* \* \* \* \*